(12) United States Patent
Ying et al.

(10) Patent No.: US 11,246,117 B2
(45) Date of Patent: Feb. 8, 2022

(54) PROCEDURES, USER EQUIPMENT AND BASE STATIONS FOR CODE BLOCK GROUP-BASED TRANSMISSION

(71) Applicants: Sharp Kabushiki Kaisha, Sakai (JP); FG Innovation Company Limited, Hong Kong (CN)

(72) Inventors: Kai Ying, Vancouver, WA (US); Toshizo Nogami, Chiba (JP); Tatsushi Aiba, Vancouver, WA (US); John Michael Kowalski, Vancouver, WA (US); Zhanping Yin, Vancouver, WA (US); Jia Sheng, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 16/007,207

(22) Filed: Jun. 13, 2018

(65) Prior Publication Data

US 2018/0368110 A1 Dec. 20, 2018

Related U.S. Application Data

(63) Continuation of application No. PCT/US2018/037140, filed on Jun. 12, 2018.
(Continued)

(51) Int. Cl.
*H04W 72/04* (2009.01)
*H04L 1/00* (2006.01)
(Continued)

(52) U.S. Cl.
CPC ............. *H04W 72/04* (2013.01); *H04L 1/004* (2013.01); *H04L 1/0041* (2013.01);
(Continued)

(58) Field of Classification Search
CPC ........ H04W 72/04; H04L 1/18; H04L 1/0041; H04L 1/0045; H04L 1/0075; H04L 1/004;
(Continued)

(56) References Cited

U.S. PATENT DOCUMENTS

| 2007/0189282 | A1* | 8/2007 | Lohr ..................... H04L 1/1845 370/370 |
| 2011/0182245 | A1* | 7/2011 | Malkamaki ........... H04L 1/1812 370/329 |

(Continued)

OTHER PUBLICATIONS

MediaTek Inc., "Discussion on CB grouping principles for CBG-based transmission with single/multi-bit HARQ-ACK eedback," 3GPP TSG RAN WG1 Meeting #89, R1-1707851, May 19, 2017 (Year: 2017).*

(Continued)

*Primary Examiner* — Thinh D Tran
(74) *Attorney, Agent, or Firm* — Austin Rapp

(57) ABSTRACT

A user equipment (UE) is described. The UE includes receiving circuitry configured to receive a radio resource control message including first information used for configuring a number of more than one code block groups (CBGs) in a transport block (TB). The receiving circuitry is also configured to receive the more than one CBGs, the more than one CBGs comprising first CBGs and second CBGs. The UE also includes processing circuitry configured to determine a number of code blocks (CBs) from the TB. A first number, a second number, a third number, and a fourth number are given based on the number of more than one CBGs and the number of CBs. The first number is a number of the first CBG(s). The second number is a number of CB(s) comprised of each of the first CBG(s). The third number is a number of the second CBG(s). The fourth number is a number of CB(s) comprised of each of the second CBG(s).

4 Claims, 20 Drawing Sheets

Related U.S. Application Data

(60) Provisional application No. 62/519,730, filed on Jun. 14, 2017.

(51) Int. Cl.
    *H04L 5/00*          (2006.01)
    *H04L 1/18*          (2006.01)

(52) U.S. Cl.
    CPC .......... *H04L 1/0045* (2013.01); *H04L 1/0075* (2013.01); *H04L 1/18* (2013.01); *H04L 1/1887* (2013.01); *H04L 1/1896* (2013.01); *H04L 5/0044* (2013.01); *H04L 5/0053* (2013.01); *H04L 1/1822* (2013.01); *H04L 1/1838* (2013.01); *H04L 1/1845* (2013.01); *H04L 5/0092* (2013.01)

(58) Field of Classification Search
    CPC ... H04L 5/0044; H04L 5/0053; H04L 5/0092; H04L 1/1845
    See application file for complete search history.

(56) References Cited

U.S. PATENT DOCUMENTS

| | | | | |
|---|---|---|---|---|
| 2018/0287745 | A1* | 10/2018 | Sun | H04L 1/1864 |
| 2018/0302128 | A1* | 10/2018 | Akkarakaran | H04L 1/1822 |
| 2019/0372720 | A1* | 12/2019 | Lee | H04L 1/1671 |
| 2020/0099474 | A1* | 3/2020 | Wikstrom | H04L 1/0075 |
| 2020/0235752 | A1* | 7/2020 | Sandberg | H03M 13/09 |

OTHER PUBLICATIONS

Akkarakaran et al., "Feedback Techniques in Wireless Communications", U.S. Appl. No. 62/485,887, filed Apr. 14, 2017 (Year: 2017).*

Sandberg et al., "LDPC Code Block Segementation", U.S. Appl. No. 62/455,098, filed Feb. 6, 2017 (Year: 2017).*

Wikstrom et al., "Enhancements for/in Retransmission Due to Conflicting Transmissions for Different Services", U.S. Appl. No. 62/455,104, filed Feb. 6, 2017 (Year: 2017).*

3GPP TR 38.913 v0.3.0, "Study on Scenarios and Requirements for Next Generation Access Technologies (Release 14)," Mar. 2016.

3GPP TR 22.862 v1.0.0, "Feasibility Study on New Services and Markets Technology Enablers Critical Communications; Stage 1 (Release 14)," Feb. 2016.

Huawei, HiSilicon, "Overview of URLLC support in NR", 3GPP TSG RAN WG1 Meeting #86bis, Lisbon, Portugal, R1-1608843, Oct. 14, 2016.

"RAN1 Chairman's Notes," 3GPP TSG RAN WG1 Meeting #86bis, Lisbon, Portugal Oct. 14, 2016.

3GPP TS 36.331, V14.0.0, Evolved Universal Terrestrial Radio Access (E-UTRA); Radio Resource Control (RRC) Protocol specification (Release 14) Sep. 2016.

3GPP TS 36.321, V14.0.0, Evolved Universal Terrestrial Radio Access (E-UTRA); Medium Access Control (MAC) Protocol specification (Release 14) Sep. 2016.

ZTE, Summary Email discussion on: "CBG based retransmission, Transmission/retransmission of preempted data beforelafter ACK NACK feedback, Preemption indication for NR", 3GPP TSG RAN WG1 Meeting #89, Hangzhou, China, R1-1709148, May 19, 2017.

International Search Report and Written Opinion issued for PCT Application No. PCT/US2018/037140 dated Sep. 25, 2018.

MediaTek Inc., "Discussion on CB grouping principles for CBG-based transmission with single/multi-bit HARQ-ACK feedback," 3GPP TSG RAN WG1 Meeting #89, R1-1707851, May 19, 2017.

Huawei, HiSilicon, "Discussion on CBG construction," 3GPP TSG RAN WG1 Meeting #89, Hangzhou, China, R1-1706963, May 19, 2017.

WILUS Inc., "Discussion on CBG based transmission for NR," 3GPP TSG RAN WG1 Meeting #89, Hangzhou, P.R. China, R1-1708978, May 19, 2017.

LG Electronics, "Discussion on CB group based HARQ operation", 3GPP TSG RAN WG1 Meeting #88bis, Spokane, USA, R1-1704916, Apr. 7, 2017.

* cited by examiner

PROCEDURES, USER EQUIPMENT AND BASE STATIONS FOR CODE BLOCK GROUP-BASED TRANSMISSION

RELATED APPLICATIONS

This application is related to and claims priority from U.S. Provisional Patent Application No. 62/519,730, entitled "PROCEDURES, USER EQUIPMENTS AND BASE STATIONS FOR CODE BLOCK GROUP-BASED TRANSMISSION," filed on Jun. 14, 2017, which is hereby incorporated by reference herein, in its entirety.

TECHNICAL FIELD

The present disclosure relates generally to communication systems. More specifically, the present disclosure relates to procedures, user equipments and base stations for code block group (CBG)-based transmission.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
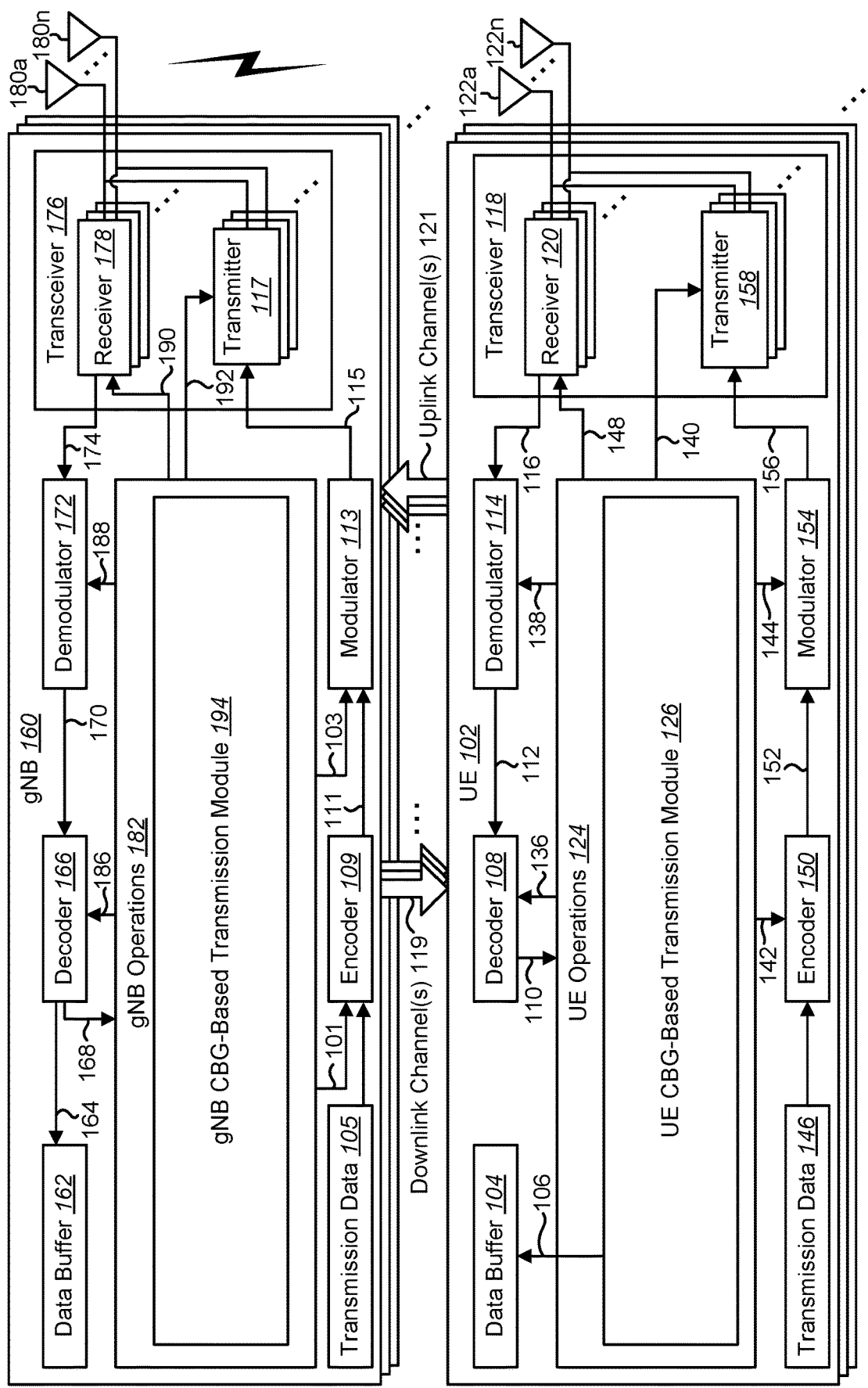
FIG. 1 is a block diagram illustrating one implementation of one or more base stations (gNBs) and one or more user equipments (UEs) in which systems and methods for code block group (CBG)-based transmission operations may be implemented.

A user equipment (UE) is described. The UE includes receiving circuitry configured to receive a radio resource control message including first information used for configuring a number of more than one code block groups (CBGs) in a transport block (TB). The receiving circuitry is also configured to receive the more than one CBGs, the more than one CBGs comprising first CBG(s) and second CBG(s). The UE also includes processing circuitry configured to determine a number of code blocks (CBs) from the TB. A first number, a second number, a third number, and a fourth number are given based on the number of more than one CBGs and the number of CBs. The first number is a number of the first CBG(s). The second number is a number of CB(s) comprised of each of the first CBG(s). The third number is a number of the second CBG(s). The fourth number is a number of CB(s) comprised of each of the second CBG(s).

The first CBG(s) comprising CBs expressed as $T_g$ ($g=0, 1, \ldots, G_+ -1$) may be given by the following equation $T_g = \{B_{g \cdot N_+}, B_{g \cdot N_+ + 1}, \Lambda, B_{g \cdot N_+ + N_+ - 1}\}$, where $B_n$ is the nth CB in the TB and $G_+$ and $N_+$ are determined based on the first information and the number of the CBs in the TB.

The second CBG(s) comprising CBs expressed as $T_g$ ($g \geq G_+$) may be given by the following equation:

$$T_g = \{B_{G_+ \cdot N_+ + (g-G_+) \cdot N_-}, B_{G_+ \cdot N_+ + (g-G_+) \cdot N_- + 1}, \Lambda, B_{G_+ \cdot N_+ + (g-G_+) \cdot N_- + N_- - 1}\}$$

where $B_n$ is the nth CB in the TB and $G_+$, $N_-$ and $N_+$ are determined based on the first information and the number of the CBs in the TB.

A base station apparatus is also described. The base station apparatus includes transmitting circuitry configured to transmit a radio resource control message including first information used for configuring a number of more than one code block groups (CBGs) in a transport block (TB). The transmitting circuitry is also configured to transmit the more than one CBGs, the more than one CBGs comprising first CBG(s) and second CBG(s). The base station apparatus also includes processing circuitry configured to determine a number of code blocks (CBs) from the TB. A first number, a second number, a third number, and a fourth number are given based on the number of more than one CBGs and the number of CBs. The first number is a number of the first CBG(s). The second number is a number of CB(s) comprised of each of the first CBG(s). The third number is a number of the second CBG(s). The fourth number is a number of CB(s) comprised of each of the second CBG(s).

A communication method of a user equipment is also described. The method includes receiving a radio resource control message including first information used for configuring a number of more than one code block groups (CBGs) in a transport block (TB). The method also includes receiving the more than one CBGs, the more than one CBGs comprising first CBG(s) and second CBG(s). The method further includes determining a number of code blocks (CBs) from the TB. A first number, a second number, a third number, and a fourth number are given based on the number of more than one CBGs and the number of CBs. The first number is a number of the first CBG(s). The second number is a number of CB(s) comprised of each of the first CBG(s). The third number is a number of the second CBG(s). The fourth number is a number of CB(s) comprised of each of the second CBG(s).

A communication method of a base station apparatus is also described. The method includes transmitting a radio resource control message including first information used for configuring a number of more than one code block groups (CBGs) in a transport block (TB). The method also includes transmitting the more than one CBGs, the more than one CBGs comprising first CBG(s) and second CBG(s). The method further includes determining a number of code blocks (CBs) from the TB. A first number, a second number, a third number, and a fourth number are given based on the number of more than one CBGs and the number of CBs. The first number is a number of the first CBG(s). The second number is a number of CB(s) comprised of each of the first CBG(s). The third number is a number of the second CBG(s). The fourth number is a number of CB(s) comprised of each of the second CBG(s).

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (mMTC) like services. A new radio base station may be referred to as a gNB. A gNB may also be more generally referred to as a base station device.

For the services to use the time/frequency/space medium efficiently it would be useful to flexibly schedule services on the medium so that the medium may be used as effectively as possible, given the conflicting needs of URLLC, eMBB, and MMTc. Currently, latency issues are addressed in LTE largely via scheduling and prioritization of transmissions. There are no real flexible uses of the medium outside of scheduling for MTC and delay tolerant services, although the Narrowband Internet of Things (NBIoT) extensions to LTE employ a specific set of time/frequency resources.

Moreover, there is little standardized information passed between different eNBs today that would enable such services to efficiently coexist. Several approaches have been proposed to enable services to coexist together, but few details have been provided.

In general, a transmission may be preempted by another transmission due to the latency requirement. A preemption indication may be required to help reception and decoding. On the other hand, a transport block (TB) may be grouped into multiple code block groups (CBGs). In a case that some CBGs are not decoded successfully, there may be no need to retransmit the whole TB. Instead, only impacted CBGs may be scheduled for retransmission. The systems and methods described herein teach how to handle CBG-based transmission, retransmission and preemption impacts.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for code block group (CBG)-based transmission operations may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., different Physical Uplink Shared Channel from PUSCH) may be defined for transmitting the URLLC data. The URLLC-PUSCH described herein is assumed to be included in the PUSCH for the sake of simple description.

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE code block group (CBG)-based transmission module 126.

The UE CBG-based transmission module 126 may perform procedures and signaling for CBG-based transmission and/or retransmission operations. Without a configuration of CBG-based transmission and/or retransmission, transmissions and retransmissions may be performed per transport block (TB). More specifically, when an eNB/gNB 160 transmits a TB in a Transmission Time Interval (TTI), the eNB/gNB 160 may divide the TB into one or more code block(s) (CBs). Channel coding may be performed per CB, and cyclic redundancy check (CRC) bits may be attached to each CB. However, transmission parameters (e.g., resource block (RB) assignment, new data indicator (NDI), modulation and coding scheme (MCS), HARQ process number, redundancy version (RV), PDSCH timing offset, HARQ timing offset) are set per TB, and the intended UE 102 is informed of a set of those parameters via a DCI format.

The UE 102 reading the DCI format receives the scheduled PDSCH. When the TB carried by the PDSCH is decoded, the UE 102 may perform decoding per CB and may check CRC per CB. The DCI format with a CBG indication may be used for PDCCH in UE-specific search space (USS). CBs of a TB may be grouped into multiple sets of CBs and each set is corresponding to a CB group (CBG). It should be noted that, for a fallback operation, even when the UE 102 is configured with CBG-based transmission and/or retransmission, PDCCH with the DCI format transmitted in common search space (CSS) may always be the same DCI format for per-TB transmission/retransmission, and the following DCI format with CBG indication might not apply.

In an aspect, scheduling downlink control information (DCI) for CBG-based transmission and/or retransmission is described herein. The DCI may be used for the scheduling of CBG-based transmission. Some purposes of a CBG indication may include one or more of the following: to indicate which CBGs of a TB is transmitted; to indicate which CBGs of a TB is not transmitted; to indicate which CBGs can be used for soft combining; to indicate which CBGs should be flushed in the buffer; or any combination of the above.

Contents that may be included in the DCI for CBG (also referred to as code block set) indication are also described herein. A first approach includes a joint design (e.g., joint coding) of a CBG indicator and new data indicator (NDI). Besides the indication for a new transmission or retransmission, the NDI field may also be used to indicate transmitted CBGs. For example, a TB may be grouped into G CBGs and the NDI field may contain G bits. In an implementation, all 0s means initial transmission of a new TB while all 1s means retransmission of a whole TB. Otherwise, NDI is a bitmap to indicate CBGs to be retransmitted and/or CBG not to be retransmitted. For example, the second bit showing 1 may indicate that the second CBG is retransmitted and the third bit showing 0 means that the third CBG is not transmitted.

Another example is described below. Among the states indicated by the joint coding information field, one state may indicate an initial transmission, and the other states may indicate retransmission. The state indicating the initial transmission might not indicate a particular CBG, since PDSCH with the initial transmission may always include all code blocks (i.e., all CBGs). On the other hand, the states indicating retransmissions may also indicate some particular CBG. Those states may indicate different code blocks. Table 1 is an implementation corresponding to this example.

TABLE 1

| Field value | Code blocks | NDI |
|---|---|---|
| 000 | N/A (i.e., all CBs) | Initial transmission |
| 001 | Code block set 0 | Retransmission |
| 010 | Code block set 1 | Retransmission |
| 011 | Code block set 2 | Retransmission |
| 100 | Code block set 3 | Retransmission |
| 101 | Code block set 4 | Retransmission |
| 110 | Code block set 5 | Retransmission |
| 111 | Code block set 6 | Retransmission |

A second approach includes a joint design of a CBG indicator and Redundancy Version (RV). Similarly, the RV field may be used for CBG indication. If CBG-based retransmission always uses the same RV, the RV field may be reused for CBG indication. Otherwise, additional bits may be added to RV field to indicate the transmitted CBGs.

Another example is described below. For initial transmission, the states indicated by the joint coding information field may indicate RV. For retransmissions, those states may indicate some particular CBG and may indicate a fixed RV (e.g. RV 0). Instead of the fixed RV, the RV with the next RV index from the previous transmission may also be applicable. Table 2 is an implementation corresponding to this example.

TABLE 2

| Field value | For initial transmission | | For retransmission | |
|---|---|---|---|---|
| | Code blocks | RV | Code blocks | RV |
| 000 | N/A (i.e., all CBs) | RV 0 | Code block set 0 | RV 0 |
| 001 | N/A (i.e., all CBs) | RV 1 | Code block set 1 | RV 0 |
| 010 | N/A (i.e., all CBs) | RV 2 | Code block set 2 | RV 0 |
| 011 | N/A (i.e., all CBs) | RV 3 | Code block set 3 | RV 0 |
| 100 | Reserved | Reserved | Code block set 4 | RV 0 |
| 101 | Reserved | Reserved | Code block set 5 | RV 0 |
| 110 | Reserved | Reserved | Code block set 6 | RV 0 |
| 111 | Reserved | Reserved | Code block set 7 | RV 0 |

A third approach includes a joint design of a CBG indicator and modulation and coding scheme (MCS). Similarly, MCS field may be used for CBG indication. If CBG-based retransmission always uses the same MCS, the MCS field may be reused for CBG indication. Otherwise, additional bits may be added to the MCS field to indicate the transmitted CBGs.

Another example of the third approach is described below. For initial transmission, the states indicated by the joint coding information field may indicate MCS. For retransmissions, those states may indicate some particular CBG and may indicate a particular MCS (e.g., the same MCS as for the initial transmission). Table 3 is an implementation corresponding to this example.

TABLE 3

| Field value | For initial transmission | | For retransmission | |
|---|---|---|---|---|
| | Code blocks | MCS | Code blocks | MCS |
| 0000 | N/A (i.e., all CBs) | MCS 0 | Code block set 0 | Same as initial tx |
| 0001 | N/A (i.e., all CBs) | MCS 1 | Code block set 1 | Same as initial tx |
| 0010 | N/A (i.e., all CBs) | MCS 2 | Code block set 2 | Same as initial tx |
| 0011 | N/A (i.e., all CBs) | MCS 3 | Code block set 3 | Same as initial tx |
| 0100 | N/A (i.e., all CBs) | MCS 4 | Code block set 4 | Same as initial tx |
| 0101 | N/A (i.e., all CBs) | MCS 5 | Code block set 5 | Same as initial tx |
| 0110 | N/A (i.e., all CBs) | MCS 6 | Code block set 6 | Same as initial tx |
| 0111 | N/A (i.e., all CBs) | MCS 7 | Code block set 7 | Same as initial tx |
| 1000 | N/A (i.e., all CBs) | MCS 8 | Code block set 8 | Same as initial tx |
| 1001 | N/A (i.e., all CBs) | MCS 9 | Code block set 9 | Same as initial tx |
| 1010 | N/A (i.e., all CBs) | MCS 10 | Code block set 10 | Same as initial tx |

TABLE 3-continued

| Field | For initial transmission | | For retransmission | |
|---|---|---|---|---|
| value | Code blocks | MCS | Code blocks | MCS |
| 1011 | N/A (i.e., all CBs) | MCS 11 | Code block set 11 | Same as initial tx |
| 1100 | N/A (i.e., all CBs) | MCS 12 | Code block set 12 | Same as initial tx |
| 1101 | N/A (i.e., all CBs) | MCS 13 | Code block set 13 | Same as initial tx |
| 1110 | N/A (i.e., all CBs) | MCS 14 | Code block set 14 | Same as initial tx |
| 1111 | N/A (i.e., all CBs) | MCS 15 | Code block set 15 | Same as initial tx |

A fourth approach includes a joint coding between CBG indication and another information X (e.g., RB assignment, Transmitter Power Control (TPC) command for PUCCH, antenna port(s), scrambling identity, the number of layers, SRS request, PDSCH RE mapping, PDSCH start position, quasi-co-location, HARQ-ACK resource offset, interference presence, HARQ process number, PDSCH timing offset, HARQ timing offset, etc.) may also be possible. The states expressed by the joint coding field may include the following states, where $X_j$ denotes the j-th possible value (or value set) for parameter X: (1) the states $j_1$, which indicate initial transmission and $X=X_{j1}$ ($j_1=0, \ldots, J_1-1$); and (2) the states $J_1+j_2$, which indicate retransmission with $CBGj_2$ ($j_2=0, \ldots, J_2-1$) and $X=X_i$, where $X_i$ denotes a particular value for X (e.g., a fixed $X_0$, the same X value as for initial transmission, a predetermined X value, etc.).

Alternatively, the states expressed by the joint coding field may include the following states: (3) the states $j_1$, which indicate $X=X_{j1}$ ($j_1=0, \ldots, J_1-1$) for initial transmission; and (4) the states $j_1$, which indicate $CBGj_1$ ($j_1=0, \ldots, J_1-1$) for retransmission.

A fifth approach includes a separate design of a CBG indicator. A separate CBG indication field may be added to the scheduling DCI for CBG-based transmission.

A sixth approach includes a cod block (CB) indicator added to a CBG indicator. In addition to a CBG indicator, a CB indicator may be used to indicate which CBs in an indicated CBG are transmitted or impacted from preemption (e.g., puncturing) in the previous transmission. In an implementation, a scheduling DCI may contain a CBG indicator followed by one or multiple CB indicators. For example, a TB may be grouped into 5 CBGs, and each CBG contains up to 2 CBs. '100010110' contains a bitmap '10001' for CBG indication and two following bitmaps '01' and '10' for CB indication. The first 5 bits '10001' indicate (parts of) the first CBG and the fifth CBG are transmitted or impacted from preemption/puncturing in the previous transmission. The following two bits '01' form a bitmap for the first CBG, which indicates the second CB in the first CBG is transmitted or impacted from preemption/puncturing in the previous transmission. The last two bits '10' form a bitmap for the fifth CBG, which indicates the first CB in the fifth CBG is transmitted or impacted from preemption/puncturing in the previous transmission.

Timing of scheduling DCI for CBG-based transmission is also described herein. K0 may be used to denote the delay between a DL grant (e.g., scheduling DCI, PDCCH) and corresponding DL data (e.g., PDSCH) reception. K1 may be used to denote the delay between DL data (e.g., PDSCH) reception and corresponding acknowledgement (e.g., ACK/NACK) transmission on the UL. Based on the timing relationship between the scheduling DCI and ACK/NACK corresponding to the previous transmission in the same HARQ process, the following two cases are described.

A first case includes the timing before ACK/NACK for previous transmission in the same HARQ process. After a DL transmission and before the corresponding ACK/NACK, a gNB 160 may send out a DCI to schedule CBG-based transmission of the same TB. It may be used for the case that the transmission is preempted/punctured by another service. So, the gNB 160 may not wait until the corresponding ACK/NACK and it may schedule a subsequent transmission for the CBGs which may be impacted by the preemption/puncturing.

A second case includes timing after ACK/NACK for previous transmission in the same HARQ process. After a DL data (PDSCH) reception, the UE 102 may send multi-bits ACK/NACK to indicate which CBGs are decoded successfully and which are not. Based on this ACK/NACK feedback from the UE 102, the gNB 160 may send out the scheduling DCI for CBGs-based (re)transmission.

The gNB behavior for CBG-based transmission is also described herein. The gNB behavior may include behavior when preemption/puncturing happens. When a transmission is preempted/punctured by another service, the gNB 160 may schedule a subsequent transmission for the CBGs which may be impacted by the preemption/puncturing before the ACK/NACK for the previous transmission in the same HARQ process. In a different design, the gNB 160 may always wait until ACK/NACK feedback and then scheduling a CBG-based (re)transmission.

The gNB behavior may also include behavior after receiving ACK/NACK. If ACK is received, the gNB 160 may schedule a new transmission. If a multi-bits NACK indicating which CBGs are not decoded successfully is received, the gNB 160 may schedule a CBG-based retransmission for these CBGs. On the other hand, scheduling DCI for the gNB 160 can always override the ACK/NACK feedback. For example, the gNB 160 may schedule a retransmission of the whole TB even though multi-bits NACK implies some CBGs are received successfully. If the gNB 160 scheduled both a transmission and a subsequent transmission before the ACK/NACK, the gNB 160 may receive two ACK/NACK feedbacks. Thus, the gNB 160 may always wait for the ACK/NACK corresponding to the subsequent transmission and then schedule the following transmission.

UE behavior for CBG-based transmission is also described herein. The UE behavior may include HARQ timeline handling. For DL data (PDSCH) reception at timing index n, the corresponding ACK/NACK is supposed to be transmitted at timing index n+K1. If the UE 102 receives another scheduling DCI for CBG-based transmission of the same TB at timing index n_r (where n≤n_r≤n+K1), this scheduling DCI may or may not impact the original ACK/NACK timeline. In one approach, the UE 102 may send the ACK/NACK corresponding to the previous transmission at timing index n+K1 and the ACK/NACK corresponding to the subsequent CBG-based transmission at timing index n_r+K0+K1. In other words, the original HARQ timeline is not impacted by the subsequent CBG-based transmission. In another approach, the UE 102 may not send ACK/NACK for the previous transmission but wait for the reception of subsequent CBG-based transmission at timing index n_r+K0. The UE 102 may send out ACK/NACK at timing index n_r+K0+K1. In other words, the original HARQ timeline is impacted by the subsequent CBG-based transmission.

The UE behavior may also include soft combining and buffer flushing. CBG decoding failure may be caused by the channel and/or preemption/puncturing. The UE 102 may have different ways to handle the CBG (re)transmission with the previous CBG transmission. In an approach, the UE 102 may always conduct soft combining for CBG (re)transmission and the previous failed CBG transmission. In another approach, the UE 102 may always flush the buffer of the previous failed CBG transmission thus no soft combining is used for these CBG with subsequent transmission. In yet another approach, the UE 102 may use blind decoding. In other words, the UE 102 may try both decoding of previous failed CBG transmission with and without soft combining. In another approach, if n≤n_r≤n+K1, the UE 102 may not try soft combining. If n_r>n+K1, the UE 102 may use soft combining for CBG (re)transmission and the previous failed CBG transmission. Whether to use soft combining or not may depend on detection of additional indication.

The DCI for preemption/puncturing indication is also described herein. Contents included in DCI for preemption/puncturing indication may include one or more of the following. The DCI may include time domain information. The time domain information may include a slot index. In an implementation, DCI for preemption/puncturing indication may be located in the same slot of the corresponding preemption/puncturing. Thus, a preempted/punctured slot index is indicated implicitly by the DCI. In another implementation, the delay may be fixed between the DCI for preemption/puncturing and the slot of corresponding preemption/puncturing. Thus, preempted/punctured slot index may indicated implicitly by the DCI. In yet another implementation, there may be no fixed timing relationship between the DCI for preemption/puncturing and the slot of corresponding preemption/puncturing. But the slot index or offset is included in DCI for preemption/puncturing indication.

The time domain information may include a mini-slot position. The mini-slot position may include a bitmap to indicate preempted/punctured OFDM symbols. The mini-slot position may include a start position and length (or end position) of a mini-slot preempting/puncturing the slot.

The DCI may also include frequency domain information (e.g., a resource block (RB) index).

The transmission with a high priority may be semi-statically configured (e.g., by RRC signaling) and/or activated (e.g., by L1 signaling or MAC CE). The preempted/punctured UE 102 may also know the time/frequency resource for the transmission with high priority. In this case, only 1 bit is needed to indicate the presence of preemption/puncturing. Or, the UE 102 may use blind decoding by assuming there is preemption/puncturing or not.

The timing of DCI for preemption/puncturing indication is also described herein. In one approach, DCI for preemption/puncturing indication may be located in the same slot of the corresponding preemption/puncturing. The UE 102 may also monitor the control channel for mini-slot transmission. The scheduling DCI for mini-slot transmission can also serve as the DCI for preemption/puncturing indication. DCI for preemption/puncturing indication may be located at the end of the slot.

In another approach, DCI for preemption/puncturing may be transmitted after the slot of corresponding preemption/puncturing. DCI for preemption/puncturing indication may be located in common search space or UE-specific search space of a following slot. DCI for preemption/puncturing may be transmitted before the ACK/NACK. Alternatively, DCI for preemption/puncturing may be transmitted after the ACK/NACK.

The gNB behavior for puncturing indication is also described herein. When a DL transmission is preempted/punctured by another DL transmission, an indication to the impacted UE 102 may be sent out by following the rules described above in connection with the contents and timing of DCI for preemption/puncturing indication.

The UE behavior for preemption/puncturing indication is also described herein. For DCI monitoring, if the impacted UE 102 is able to monitor the control channel for mini-slot transmission, the scheduling DCI for mini-slot transmission can also serve as the DCI for preemption/puncturing indication. The UE 102 may monitor the DCI for indication by following the rules in the specification. The DCI may be located in a common search space or a UE-specific search space. The timing of the DCI may be fixed or flexible.

For decoding with indication information, with the knowledge of preemption/puncturing information, the UE 102 may decode CBs by replacing the preempted/punctured part with 0 log likelihood ratios (LLRs). If the DCI for preemption/puncturing is transmitted before a corresponding ACK/NACK, a 0 LLR replacement of the punctured part may be applied to the current decoding processing. If the DCI for preemption/puncturing is transmitted after corresponding ACK/NACK, 0 LLR replacement or buffer flushing of the punctured part may be applied to joint decoding of the following retransmission and previous transmission for the same TB.

Joint consideration of scheduling DCI for CBG-based transmission and DCI for preemption/puncturing indication is also described herein. In general, scheduling DCI for CBG-based transmission and DCI for preemption/puncturing indication are designed and transmitted independently. When both DCIs are supported, DCI for preemption/puncturing indication may help decode the CBG-based (re) transmission.

In an example, when a DL transmission is preempted/punctured by another DL transmission at timing index n, a scheduling DCI for CBG-based transmission of the same TB is transmitted at timing index n_r (where n_r<n+K1) and a DCI for preemption/puncturing indication is transmitted at timing index n_p (where n_p<n+K1, n_p can be equal to n_r). The UE 102 may flush the buffer of the preempted/punctured part and then conduct soft combing with the subsequent CBG-based transmission. Finally, ACK/NACK feedback is sent out at time index n+K1.

In another example for the case of n_r>n+K1 and n_p<n_r+K0+K1, when soft combining the failed CBGs and the retransmitted CBGs, the punctured part of the failed CBGs should be eliminated first. Then, ACK/NACK feedback is sent out at time index n_r+K0+K1.

Additional details for the systems and methods for CBG-based transmission are provided. Namely, the gNB 160 may perform CBG-based transmission according to the descriptions below. Also, the UE 102 may determine CBs and/or CBGs according to the descriptions below. The number of code block groups (CBGs) in a transport block (TB) may be configured by RRC, or indicated by L1 signaling (e.g., PDCCH, DCI) or L2 signaling (e.g., MAC CE) or determined by some parts of the specification, which is denoted by G here. The maximum number of code blocks (CBs) in a CBG is $$N_+ = \left\lceil \frac{C}{G} \right\rceil,$$

where C is the number of CBs in the TB. On the other hand, the minimum number of CBs in a CBG is $N_- = N_+ - 1$. $N_-$ can be 0. The number of CBGs with $N_+$ CBs is $G_+=C-N_-\cdot G$ or $G_+=G-G_-$. The number of CBGs with $N_-$ CBs is $G_-=N_+\cdot G-C$ or $G_-=G-G_+\cdot G_-$ can be 0.

All the CBs in a TB may be denoted by $B_0, B_1, \Lambda, B_{C-1}$. Then these CBs may be grouped into G CBGs, which are denoted by $T_0, T_1, \Lambda, T_{G-1}$.

There are many ways to group the CBs. For example, the first $N_+\cdot G_+$ CBs may be grouped into $G_+$ CBGs with size $N_+$, or the first $N_-\cdot G_-$ CBs may be grouped into $G_-$ CBGs with size $N_-$. In a general design, any $N_+$ or $N_-$ CBs can form a CBG. A detailed example is shown in Listing 1.

---
Listing 1
---

```
if C < G
    if 0 ≤ g < C
        T_g = B_g
    else if C ≤ g < G
        T_g = ∅
    end if
else if C ≥ G
    if 0 ≤ g < G_+
        T_g = {B_{g·N_+}, B_{g·N_+ +1}, Λ, B_{g·N_+ +N_+ −1}}
    else if G_+ ≤ g < G
        T_g = {B_{G_+·N_+ +(g−G_+)·N_-}, B_{G_+·N_+ +(g−G_+)·N_- +1}, Λ,
               B_{G_+·N_+ +(g−G_+)·N_- +N_- −1}}
    end if
end if
```

---

A scheduling Downlink Control Information (DCI) may be sent by the gNB 160 to schedule a CBG-based (re)transmission. The scheduling DCI may indicate which CBGs of a TB are transmitted. The selection of CBGs to be transmitted may be determined by HARQ feedback from the UE 102, impact to a previous transmission of the same TB from preemption/puncturing of a different transmission, implementation or other rules in some parts of the specification.

As described above, K0 may be used to denote the delay between DL grant (scheduling DCI, PDCCH) and corresponding DL data (PDSCH) reception and K1 may be used to denote the delay between DL data (PDSCH) reception and corresponding acknowledgement (ACK/NACK) transmission on UL. The gNB 160 may schedule a subsequent CBG-based (re)transmission in the same HARQ process without waiting for the HARQ feedback. K2 may be used to denote the delay between a DL data (PDSCH) reception and a DL grant (scheduling DCI, PDCCH) for a subsequent transmission in the same HARQ process. K3 may be used to denote the delay between ACK/NACK reception in UL and a DL grant (scheduling DCI, PDCCH) for a transmission in the same HARQ process. The timing parameters K0, K1, K2 and K3 may be configured by RRC, or indicated by L1 signaling (e.g., PDCCH, DCI) or L2 signaling (e.g., MAC CE), or determined by some parts of the specification.

The scheduling DCI may contain information indicating which CBGs of a TB are transmitted or not and/or which CBGs of the previous transmission should be flushed in the buffer or soft combined with the retransmission. This information is referred to herein as a CBG indicator.

The gNB 160 may not need to schedule a transmission of a whole TB. Instead, the gNB 160 may schedule a CBG-based transmission for one or multiple CBGs of the TB. The scheduling DCI may contain the CBG indicator indicating which CBG(s) will be transmitted.

In a different design, the gNB 160 may always schedule a transmission for the whole TB. The CBG indicator included in the scheduling DCI may indicate which CBG(s) of the same TB in the previous transmission should be flushed in the buffer and cannot be soft-combined with the scheduled transmission. Also, in a combined design, the CBG indictor included in the scheduling DCI may indicate which CBG(s) are scheduled for transmission and these CBGs of the same TB in the previous transmission may be flushed in the buffer and cannot be soft-combined with the scheduled transmission.

As described above, the CBG indicator may be jointly designed with a new data indicator (NDI). For example, the NDI field may contain G bits so that it may be a bitmap to indicate which CBGs of a TB are transmitted. If all the bits in the NDI field are 0 (or 1), then the scheduling DCI indicates a transmission of a new TB. Otherwise, it indicates a CBG-based retransmission of the same TB. If the g th bit is set as 1 (or 0), it means the g th CBG $T_g$ (g may be indexed from 1 or 0, which depends on the descriptions of design or implementation) of the TB is transmitted. If all the G bits are set as 1 (or 0), it indicates a retransmission of the whole TB. In a different design, the NDI field may contain M (e.g., M<G) bits. Thus, NDI has $2^M$ values indexed from 0 to $2^M-1$. Each value presents a CBG indication. For example, an NDI value index 0 means a new transmission of a new TB. NDI value index $2^M-1$ means a retransmission of the whole TB. NDI value index m means the m-th CBG is retransmitted, or m-th CBG and immediately following 1 (e.g., 1) CBG(s) are retransmitted, or all the CBGs indexed greater than (or not less than) m are retransmitted, or all the CBGs indexed up to (or less than) m are retransmitted.

In another implementation, the CBG indicator may be jointly designed with a Modulation and Coding Scheme (MCS). The reserved, remaining or unused values of the MCS field may be reused to indicate CBGs of a TB are transmitted. For example, some values in NR MCS table may be reserved. If one of these values is used, it may mean that MCS of the CBG transmission is the same as the previous transmission in the same HARQ process and it may also indicate which CBGs of a TB are transmitted or not and/or which CBGs of the previous transmission should be flushed in the buffer or soft combined with the retransmission. In an example, an MCS field contains 5 bits, which means MCS field has 32 values indexed from 0 to 31. MCS values indexed from 0 to 28 are used for MCS indication while the remaining values are reserved. MCS value index 29 (30, or 31) means the first (second, or third) CBG is retransmitted and/or the first (second or third) CBG of the previous should not be soft combined.

In another implementation, the CBG indicator may be jointly designed with a Redundancy Version (RV). The reserved or remaining or unused values of the RV field may be reused to indicate CBGs of a TB are transmitted and/or flushed in the previous buffer. The design can be similar to the MCS examples above.

Also, the CBG indicator may use a separate field in the scheduling DCI. The field may contain a fixed number of bits. The field may contain G bits so that it may be a bitmap of CBGs. Each bit may correspond to a CBG. If the g-th bit is set as 1 (or 0), it means the g-th CBG $T_g$ of the TB is transmitted and/or the g-th CBG of the same TB in the previous transmission should not be soft combined.

In a different design, the CBG indicator field may contain M (e.g., M<G) bits. Thus, CBG indicator has $2^M$ values indexed from 0 to $2^M-1$. Each value presents a CBG indication. For example, a CBG indicator value index m means the m-th CBG is transmitted, or the m-th CBG and immediately following 1 (e.g., 1) CBG(s) are transmitted, or all the CBGs indexed greater than (or not less than) m are transmitted, or all the CBGs indexed up to (or less than) m are transmitted.

In addition to the CBG indicator, a CB indicator may be used to indicate which CBs in an indicated CBG are transmitted and/or impacted from preemption/puncturing in the previous transmission. For example, a scheduling DCI may contain a CBG indicator followed by one or multiple CB indicators. The CBG indicator may contain a fixed number of bits. The number of CB indicators following the CBG indicator may be fixed and each CB indicator may contain a fixed number of bits. In an example, a TB is grouped into 5 CBGs, and each CBG contains up to 2 CBs. '100010110' contains a bitmap '10001' for CBG indication and two following bitmaps '01' and '10' for CB indication. The first 5 bits '10001' indicates (parts of) the first CBG and the fifth CBG are transmitted and/or impacted from preemption/puncturing in the previous transmission. The following two bits '01' forms a bitmap for the first CBG, which indicates the second CB in the first CBG is transmitted and/or impacted from preemption/puncturing in the previous transmission. The last two bits '10' forms a bitmap for the fifth CBG, which indicates the first CB in the fifth CBG is transmitted and/or impacted from preemption/puncturing in the previous transmission.

The usage of CB indicators may depend on the CBG indicator field. If the CBG indicator indicates only one CBG, then only the first following CB indicator is used while the second CB indicator is ignored. If the CBG indicator indicates more than two CBGs, then only two CBGs have a CB indicator and the remaining CBGs use a defaulted "indication." For example, the whole CBG may be transmitted and/or flushed in the previous buffer.

A scheduled DL data (PDSCH) transmission (which is referred as the previous transmission here) at timing (e.g., slot) index n may be preempted/punctured by another transmission. The gNB 160 may send out a scheduling DCI at timing index n+K2 to indicate a CBG-based transmission of the same TB. The CBG indicator included in the scheduling DCI may indicate which CBGs of the same TB may be impacted by preemption/puncturing and will be retransmitted. Or, the CBG indicator may indicate which CBGs of the previous transmission should be flushed in the buffer and not soft combined with the retransmission.

The gNB 160 may receive ACK/NACK feedback in the UL at timing (e.g., slot) index n+K1. Then, the gNB 160 may send out a scheduling DCI at timing index n+K1+K3 to indicate a CBG-based transmission. The scheduling DCI may be based on the ACK/NACK feedback in UL. The indicated CBG-based transmission may be a retransmission of the same TB or a new transmission. For example, if the ACK/NACK feedback indicates the g th CBG $T_g$ of the TB is not decoded successfully, then the gNB 160 may send out a scheduling DCI indicating the g th CBG $T_g$ of the TB is retransmitted. If the ACK/NACK feedback indicates the whole TB is received successfully, then the gNB 160 may send out a scheduling DCI indicating a new transmission.

The gNB 160 may send out a scheduling DCI for the same TB before the ACK/NACK feedback for the previous transmission of the same TB. Assuming the previous transmission is at timing (e.g., slot) index n. In this case, the gNB 160 may receive two ACK/NACK feedbacks from the UE 102. One (which is referred as the first ACK/NACK) is at timing (e.g., slot) index n+K1, which is corresponding to the previous transmission at timing (e.g., slot) index n. The other (which is referred as the second ACK/NACK) is at timing (e.g., slot) index n+K2+K0+K1, which is corresponding to the subsequent transmission at timing (e.g., slot) index n+K2+K0. The gNB 160 may ignore the first ACK/NACK and wait for the second ACK/NACK, and then take action based on the second ACK/NACK feedback. Also, the gNB 160 may take action for each ACK/NACK feedback separately. Also, if the first ACK/NACK feedback indicates a successful transmission, the gNB 160 may ignore the second ACK/NACK.

The UE 102 may monitor the scheduling DCI at a UE-specific search space. The DL grant (e.g., scheduling DCI, PDCCH) received at timing (e.g., slot) index n_DCI indicates a corresponding DL data (e.g., PDSCH) reception at timing (e.g., slot) index n_DCI+K0. K0 can be 0. The CBG indicator included in the scheduling DCI may inform the UE 102 which CBGs are scheduled for transmission. Also, the CBG indicator included in the scheduling DCI may inform the UE 102 which CBGs of the previous transmission should be flushed in the buffer and not soft combined with the scheduled transmission.

After receiving the DL grant (e.g., scheduling DCI, PDCCH) and the corresponding scheduled DL data (e.g., PDSCH) transmission, the UE 102 may soft combine the scheduled CBG-based transmission with the previous transmission of the same TB for decoding. Also, the UE 102 may flush the indicated CBGs of the previous transmission and not use them for soft combining. The UE 102 may try to decode both with and without soft combining for the indicated CBGs. Also, the UE 102 may take actions differently according to the timing of the scheduling DCI reception. For example, if the UE 102 receives the scheduling DCI before the corresponding ACK/NACK for the previous transmission, the UE 102 may flush the indicated CBGs of the previous transmission. If the UE 102 receives the scheduling DCI after the corresponding ACK/NACK for the previous transmission, the UE 102 may soft combine the previous transmission and the scheduled transmission.

After DL data (PDSCH) reception and decoding, the UE 102 may send out the corresponding ACK/NACK feedback. However, the gNB 160 may send out a scheduling DCI for the same TB before the ACK/NACK feedback for the previous transmission of the same TB. Assuming the previous transmission is at timing (e.g., slot) index n, there may be two ACK/NACK feedbacks. One (which is referred as the first ACK/NACK) is at timing (e.g., slot) index n+K1, which is corresponding to the previous transmission at timing (e.g., slot) index n. The other (which is referred as the second ACK/NACK) is at timing (e.g., slot) index n+K2+K0+K1, which is corresponding to the subsequent transmission at timing (e.g., slot) index n+K2+K0. The UE 102 may send out both ACK/NACK feedback, or the UE 102 may give up the first ACK/NACK feedback and just send the second ACK/NACK, or the UE 102 may give up the second ACK/NACK if the first ACK/NACK feedback indicates a successful transmission (e.g., ACK).

When a transmission is preempted (e.g., punctured) by another transmission, the gNB 160 may send out a DCI indicating the preemption. The delay between the DCI for preemption and the slot of corresponding preemption may be denoted by P. P may be configured by RRC, or indicated by L1 signaling (e.g., PDCCH, DCI) or L2 signaling (e.g., MAC CE), or determined by some parts of the specification. P can be 0, which means DCI for preemption indication is located in the same timing (e.g., slot, subframe, mini-slot, OFDM symbol) of the corresponding preemption. P may be fixed or determined by other parts of the specification. If the UE 102 receives the DCI for preemption indication at timing (e.g., slot) index n+P, the UE 102 knows that the transmission at timing (e.g., slot) index n is impacted by the preemptions. P may be dynamically indicated, which means DCI for preemption indication may always indicate the timing relationship between the DCI and the corresponding preemption, or the timing (e.g., slot) index of the corresponding preemption explicitly.

The transmission may be preempted by a shorter transmission (e.g., mini-slot based transmission). Thus, the DCI for preemption indication may also need to indicate the mini-slot position. The mini-slot based preemption information may be a bitmap to indicate preempted/punctured OFDM symbols, or start position and length (or end position) of a mini-slot preempting/puncturing the slot.

The DCI for preemption indication may also indicate frequency-domain information (e.g., resource block index) of the preemption.

DCI for preemption/puncturing indication may be located in the same slot of the corresponding preemption/puncturing. The DCI for preemption/puncturing indication may be included in the control channel for mini-slot transmission. The scheduling DCI for mini-slot transmission can also serve as the DCI for preemption/puncturing indication. Also, the DCI for preemption/puncturing indication may be located at the end of the slot.

DCI for preemption/puncturing may be transmitted after the slot of corresponding preemption/puncturing. DCI for preemption/puncturing indication may be located in a common search space or a UE-specific search space of a following slot. DCI for preemption/puncturing may be transmitted before the corresponding ACK/NACK of the preempted transmission. Or, DCI for preemption/puncturing may be transmitted after the corresponding ACK/NACK of the preempted transmission.

The UE 102 may be configured to monitor the DCI for preemption indication. If the impacted UE 102 is able to monitor the control channel for mini-slot transmission, the scheduling DCI for mini-slot transmission may also serve as the DCI for preemption/puncturing indication. The UE 102 may monitor the DCI for preemption indication by following the rules in the specification. The UE 102 may monitor the DCI in a common search space or UE-specific search space.

The timing relationship between the DCI and the corresponding impacted slot may be fixed or flexible. If the UE 102 receives the DCI for preemption indication at timing (e.g., slot) index n+P, the UE 102 knows that the transmission at timing (e.g., slot) index n is impacted by the preemptions. P may be fixed and determined by the other part of the specification. P may be dynamically indicated, which means DCI for preemption indication may always indicate the timing relationship between the DCI and the corresponding preemption, or the timing (e.g., slot) index of the corresponding preemption explicitly.

The UE 102 may decode the impacted transmission based on the preemption/puncturing information included in the DCI. The UE 102 can decode CBs by replacing the preempted/punctured part (given by the time/frequency information, which is derived from the received DCI for preemption indication) with 0 log likelihood ratios (LLRs). If the DCI for preemption/puncturing is transmitted before corresponding ACK/NACK, 0 LLR replacement of the punctured part may be applied to the current decoding processing. If the DCI for preemption/puncturing is transmitted after corresponding ACK/NACK, 0 LLR replacement or buffer flushing of the punctured part may be applied to joint decoding of the following retransmission and previous transmission for the same TB.

In a special design, the transmission with high priority may be semi-statically configured (by RRC signaling, for instance) and/or activated (e.g., by L1 signaling or MAC CE). The preempted/punctured UE 102 may also be configured to receive the time/frequency resource information for the transmission with high priority. In this case, only 1 bit is needed to indicate the presence of preemption/puncturing. Or, the UE 102 may use blind decoding by assuming there is preemption/puncturing or not.

The gNB 160 may be configured to transmit both the scheduling DCI for CBG-based transmission and the DCI for preemption indication. The UE 102 may be configured to monitor both the scheduling DCI for CBG-based transmission and the DCI for preemption indication. DCI for preemption/puncturing indication may help decode the CBG-based (re)transmission.

Some examples of CBG-based transmission are provided. When a DL transmission is preempted/punctured by another DL transmission at timing index n, a scheduling DCI for CBG-based transmission of the same TB is transmitted at timing index n_r (where n_r<n+K1) and a DCI for preemption/puncturing indication is transmitted at timing index n_p (where n_p<n+K1, and n_p can be equal to n_r). The UE 102 may flush the buffer of the preempted/punctured part and then conduct soft combing with the subsequent CBG-based transmission. Finally, ACK/NACK feedback is sent out at time index n+K1. For the case of n_r>n+K1 and n_p<n_r+K0+K1, the preempted/punctured part of the failed CBGs should be eliminated first and the UE 102 soft combines the failed transmission (without the preempted part) and the retransmission. Then, ACK/NACK feedback is sent out at time index n_r+K0+K1.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB CBG-based transmission module 194. The gNB CBG-based transmission module 194 may perform CBG-based transmission operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
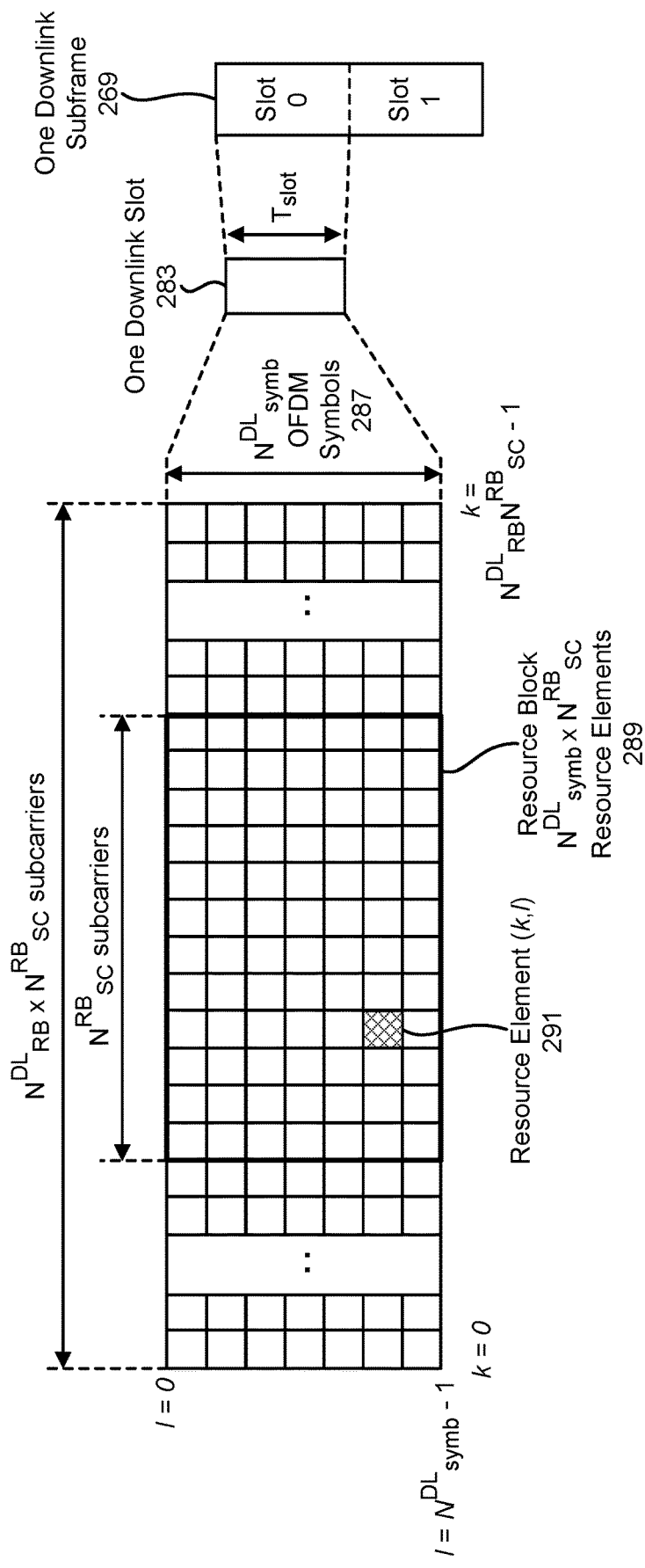
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 291 may be the RE 291 whose index 1 fulfils $1 \geq l_{data,start}$ and/or $l_{data,end} \geq 1$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
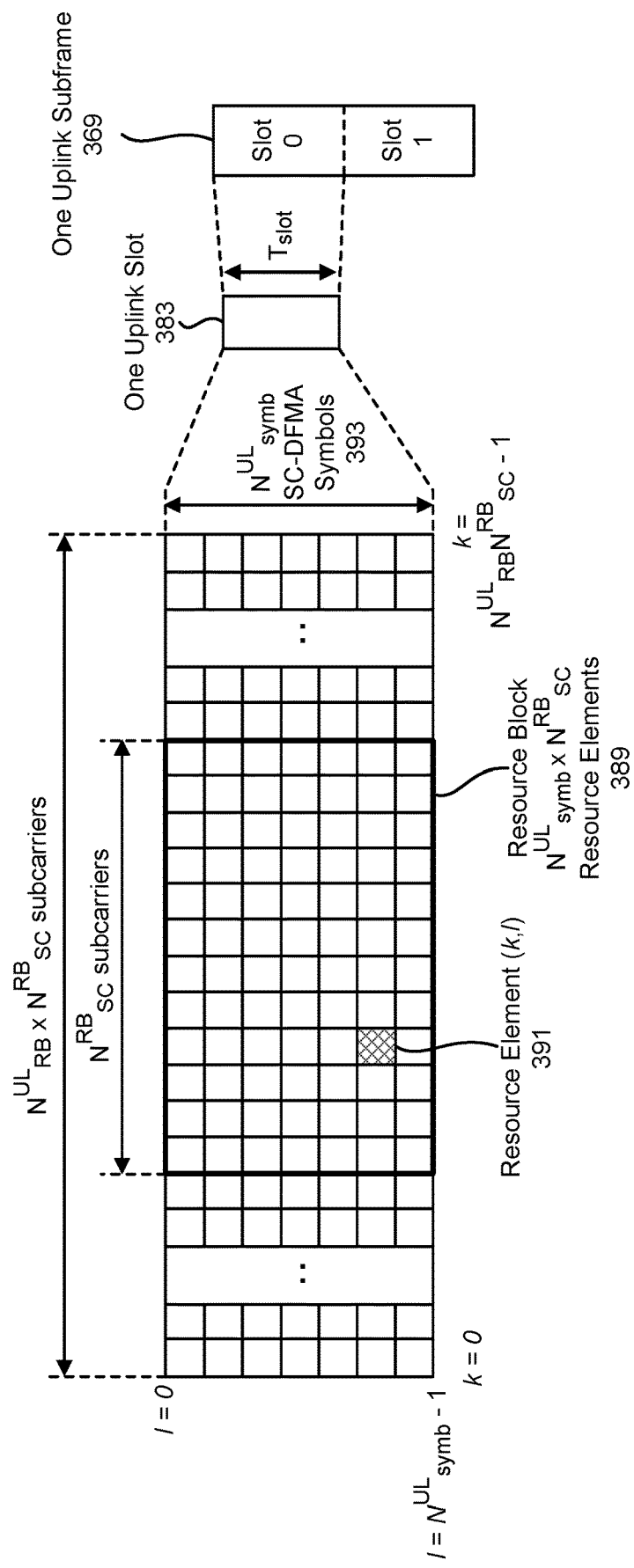
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
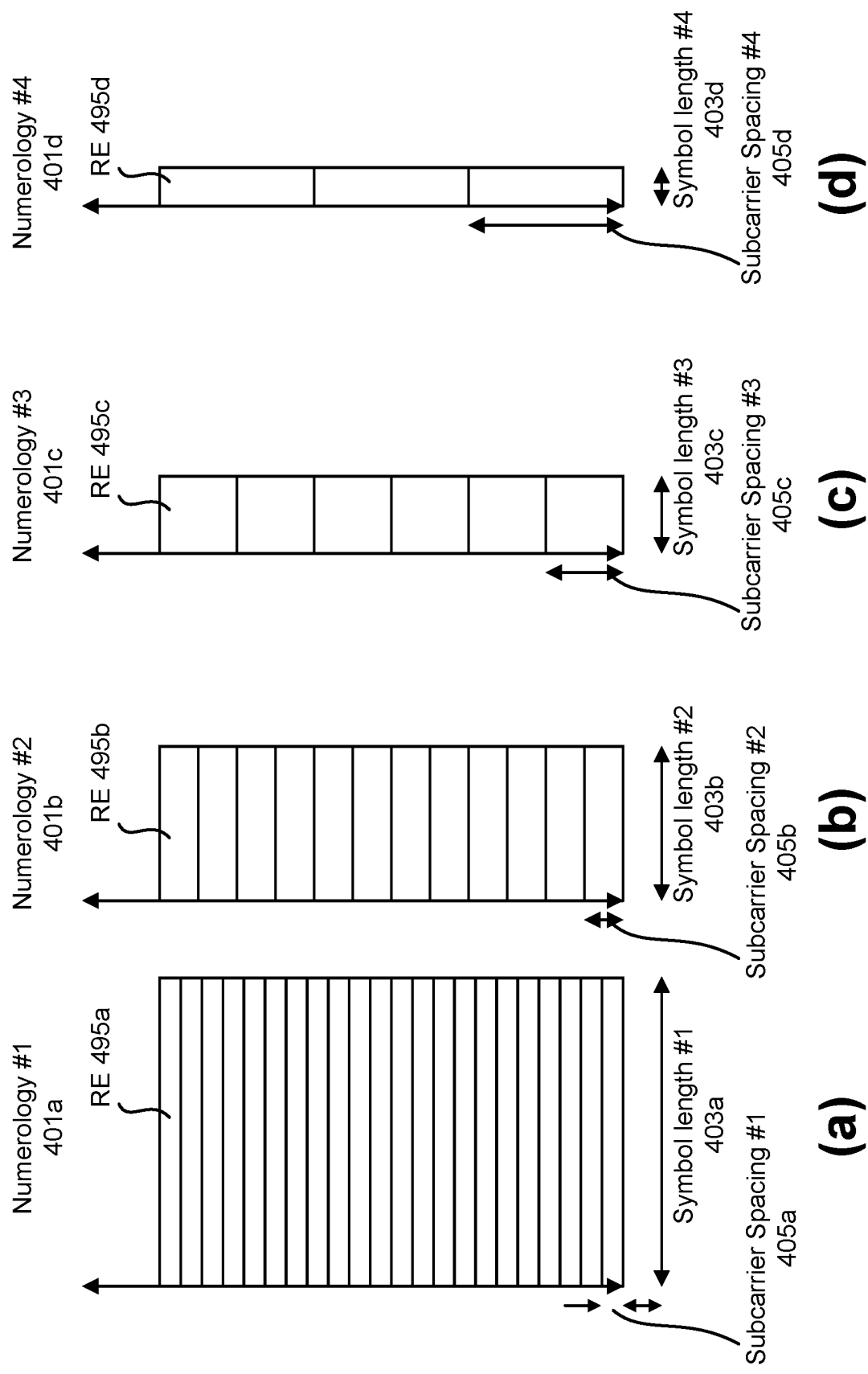
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology.

In Numerology #2 401b, the RE 495b may be defined with symbol length #2 403b and subcarrier spacing #2 405b. In Numerology #3 401c, the RE 495c may be defined with symbol length #3 403c and subcarrier spacing #3 405c. In Numerology #4 401d, the RE 495d may be defined with symbol length #4 403d and subcarrier spacing #4 405d.

While four numerologies 401a-d are shown in FIG. 4, the system may support another number of numerologies 401. Furthermore, the system does not have to support all of the 0-th to the I-th numerologies 401, i=0, 1, . . . , I.

Figure 5:
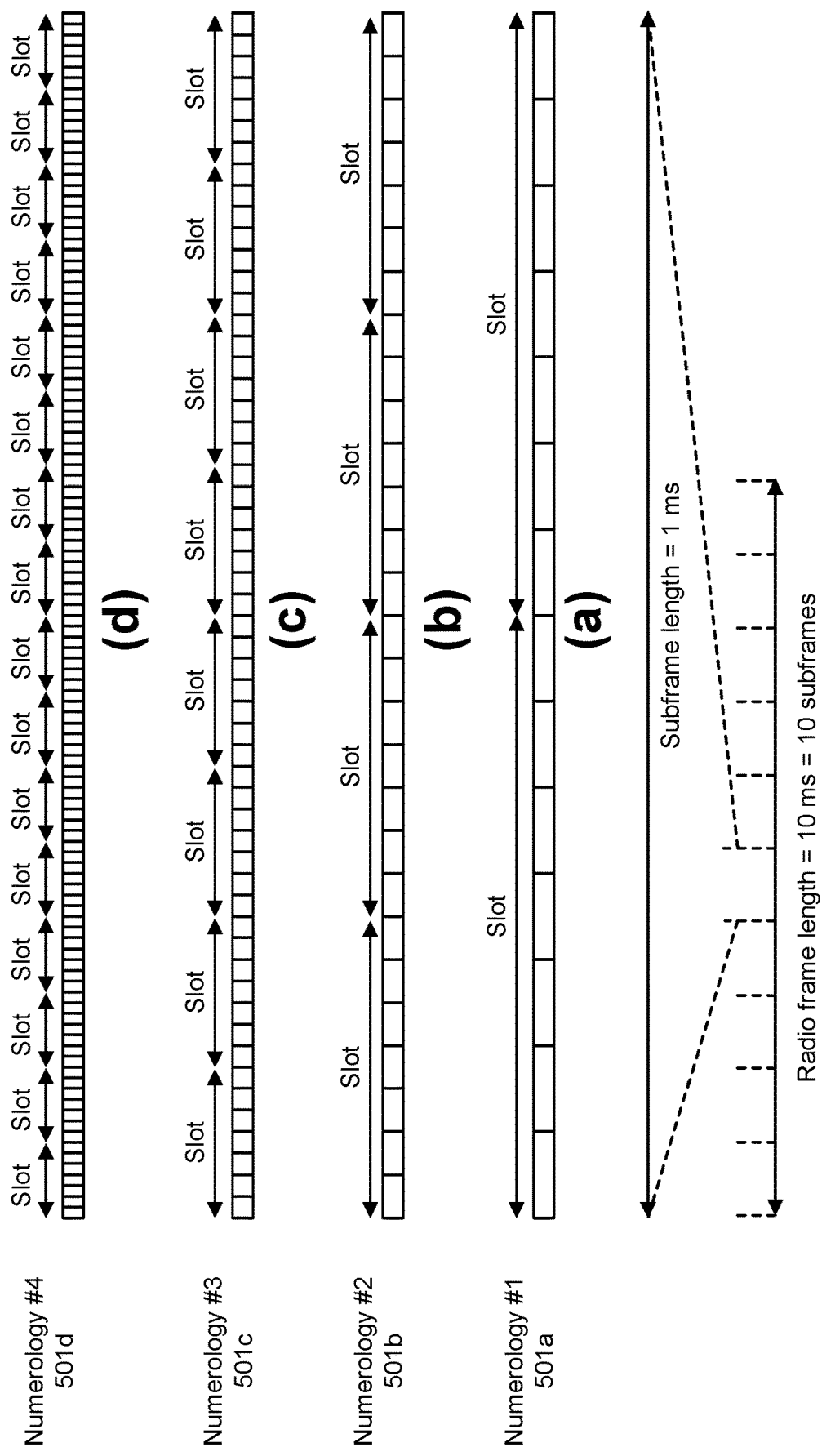
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
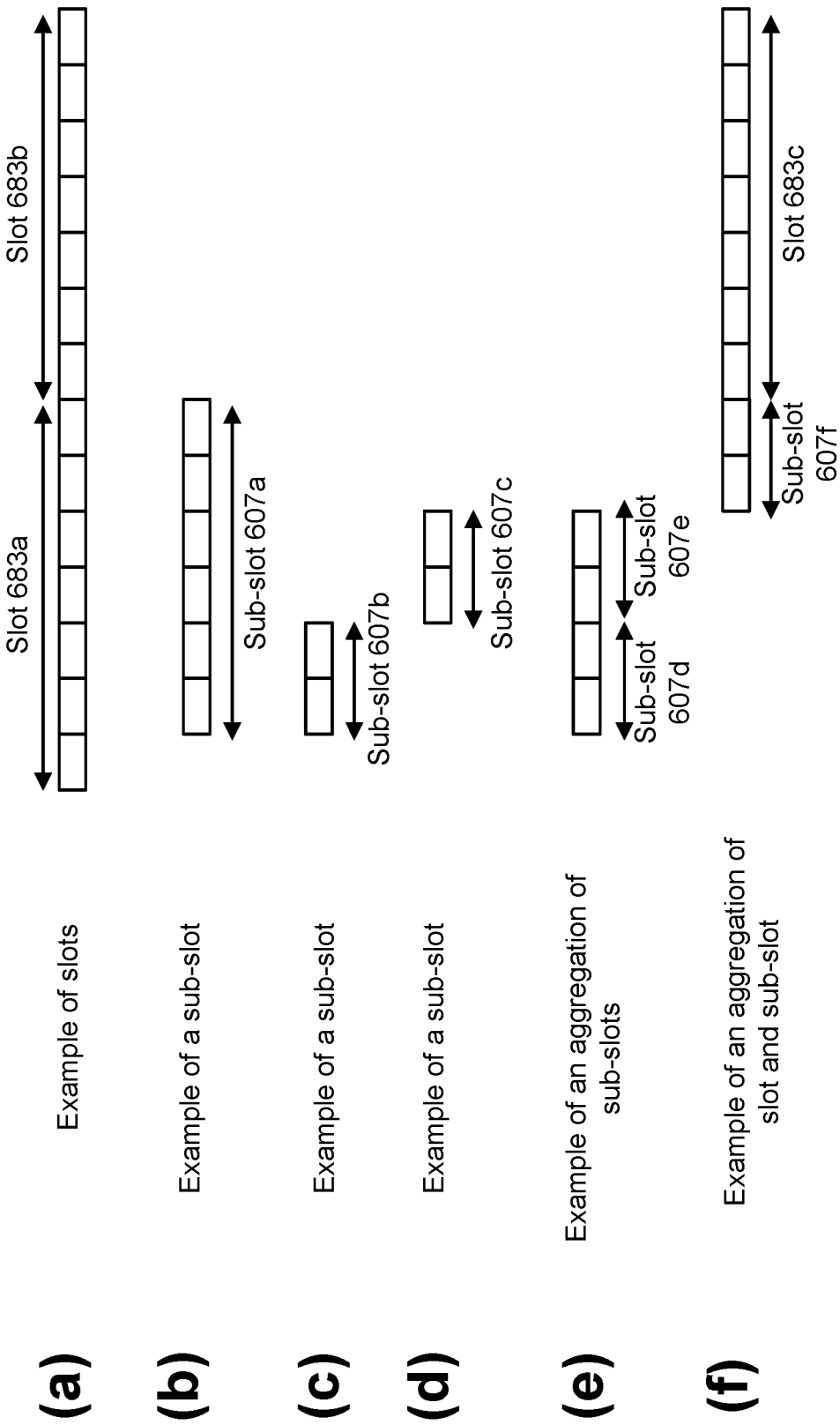
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Example (a) illustrates slots 683a-b with seven symbols. Example (b) illustrates a sub-slot 607a of six symbols. Example (c) illustrates a sub-slot 607b of two symbols. Example (d) illustrates a sub-slot 607c of two symbols. Example (e) illustrates an aggregation of sub-slots 607d-e. Example (f) illustrates an aggregation of a sub-slot 607f and a slot 683c.

Figure 7:
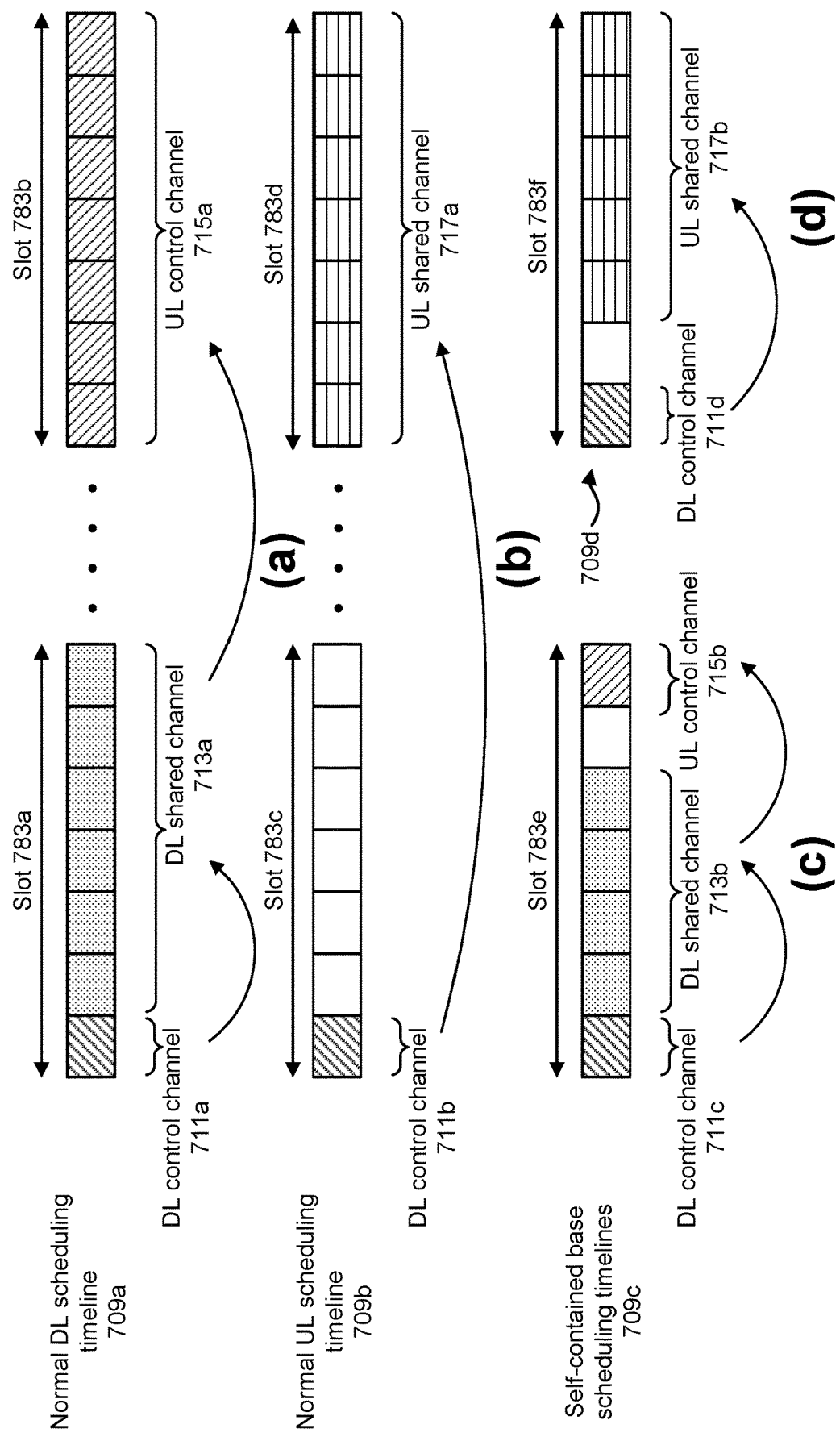
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783*b*. In this instance, a given slot 783 may contain either one of DL transmission and UL transmission.

For a normal UL scheduling timeline 709*b*, DL control channels 711*b* are mapped the initial part of a slot 783*c*. The DL control channels 711*b* schedule UL shared channels 717*a* in a later slot 783*d*. For these cases, the association timing (time shift) between the DL slot 783*c* and the UL slot 783*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709*c*, DL control channels 711*c* are mapped to the initial part of a slot 783*e*. The DL control channels 711*c* schedule DL shared channels 713*b* in the same slot 783*e*. HARQ-ACKs for the DL shared channels 713*b* are reported in UL control channels 715*b*, which are mapped at the ending part of the slot 783*e*.

For a self-contained base UL scheduling timeline 709*d*, DL control channels 711*d* are mapped to the initial part of a slot 783*f*. The DL control channels 711*d* schedule UL shared channels 717*b* in the same slot 783*f*. For these cases, the slot 783*f* may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
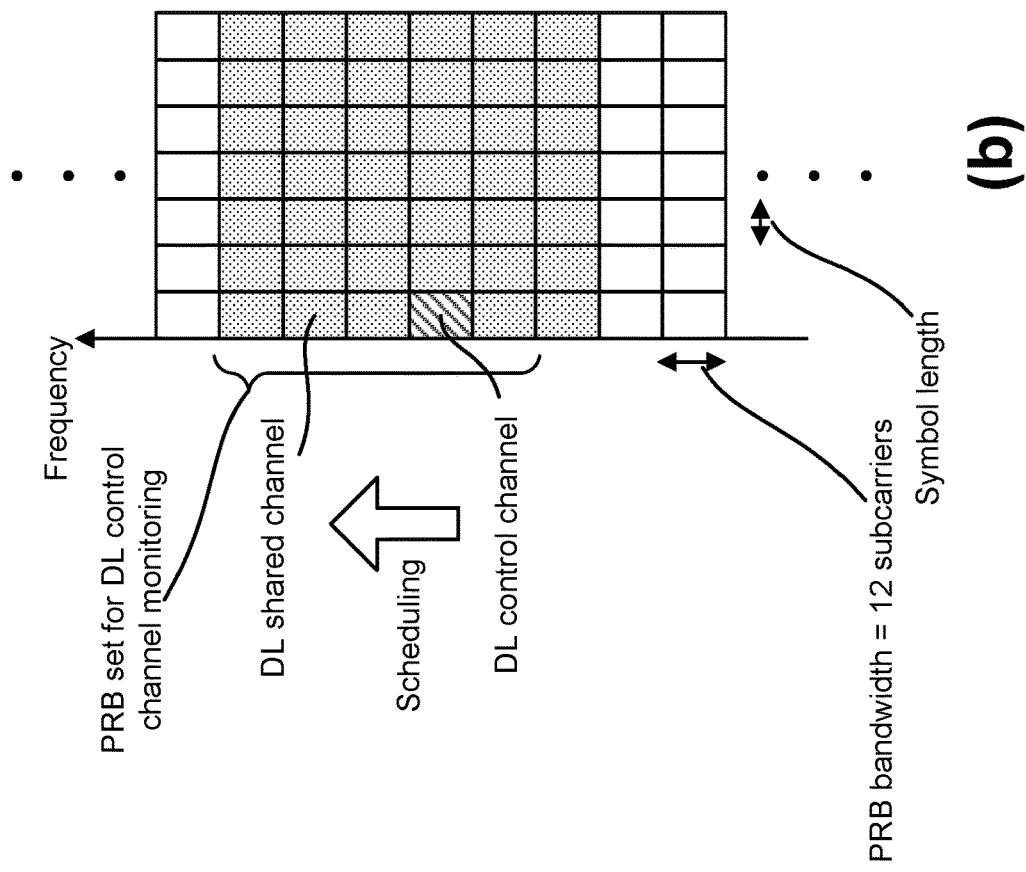
FIG. 8 shows examples of downlink (DL) control channel monitoring regions.
Figure 8:
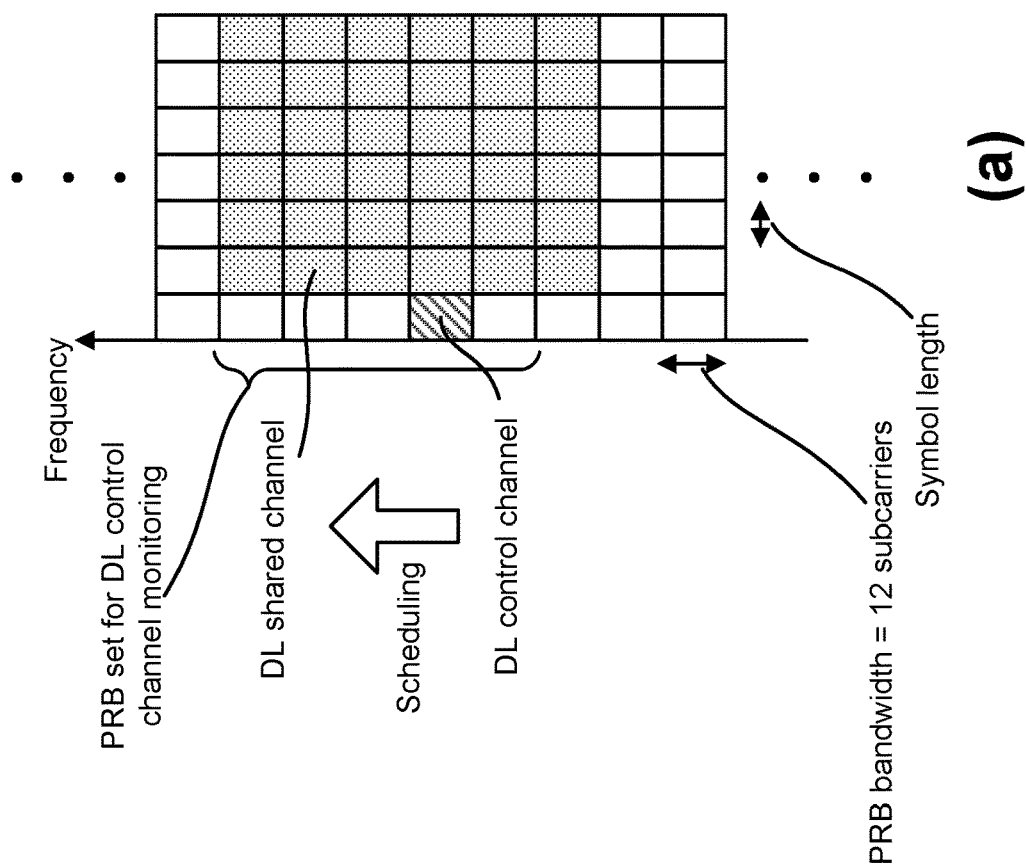

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DM-RS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
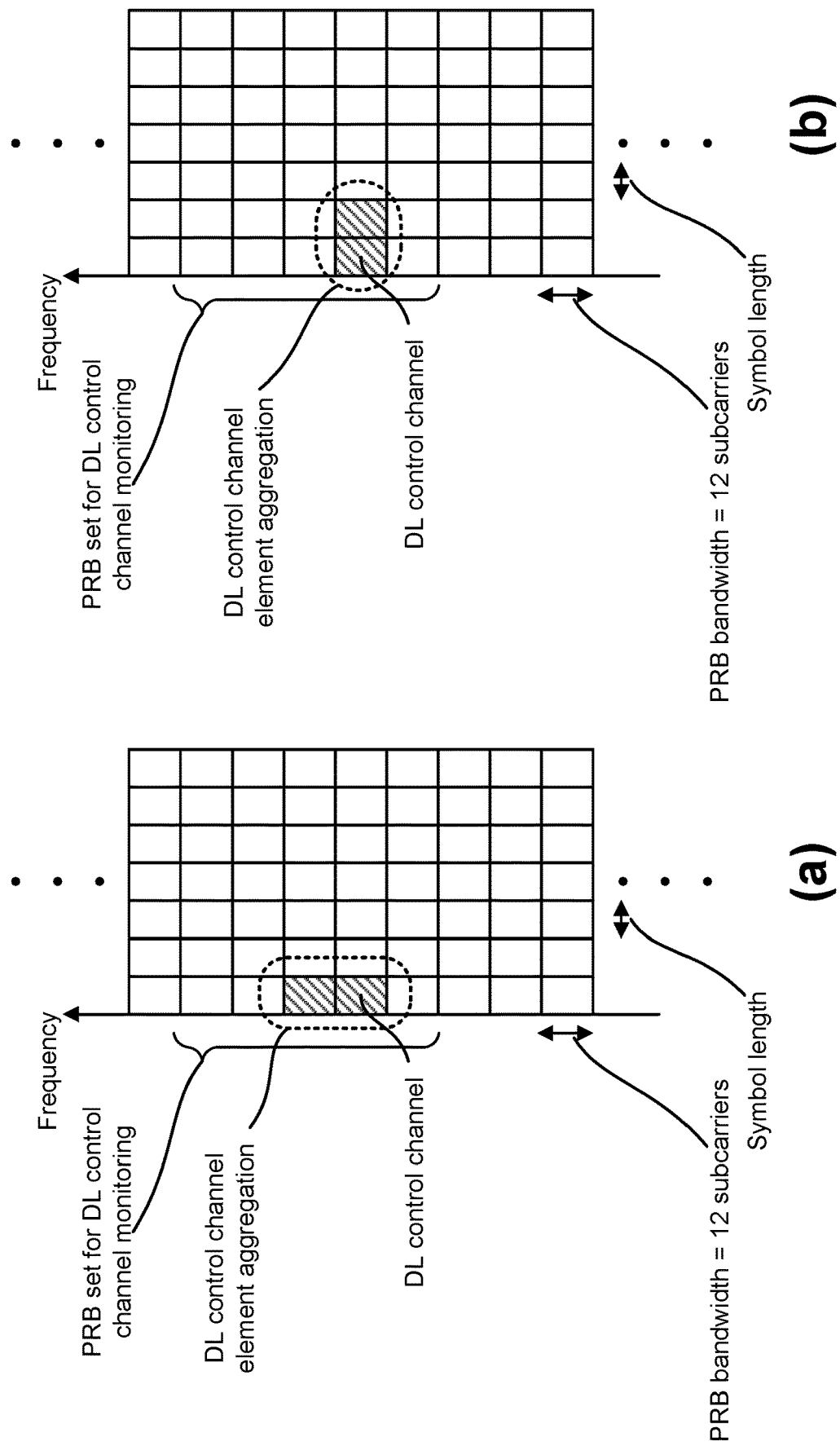
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
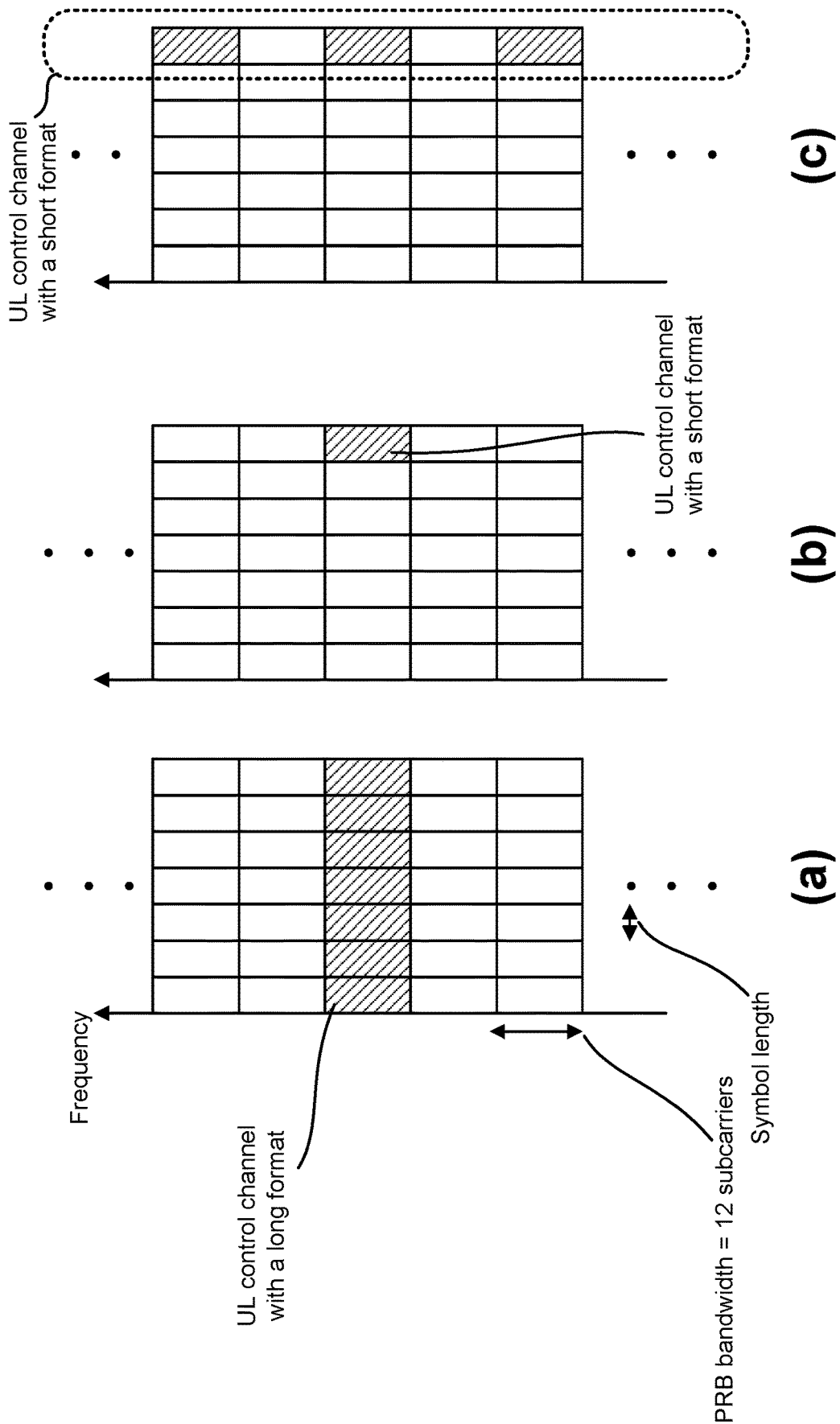
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g., 5 or 10) within a system bandwidth.

Figure 11:
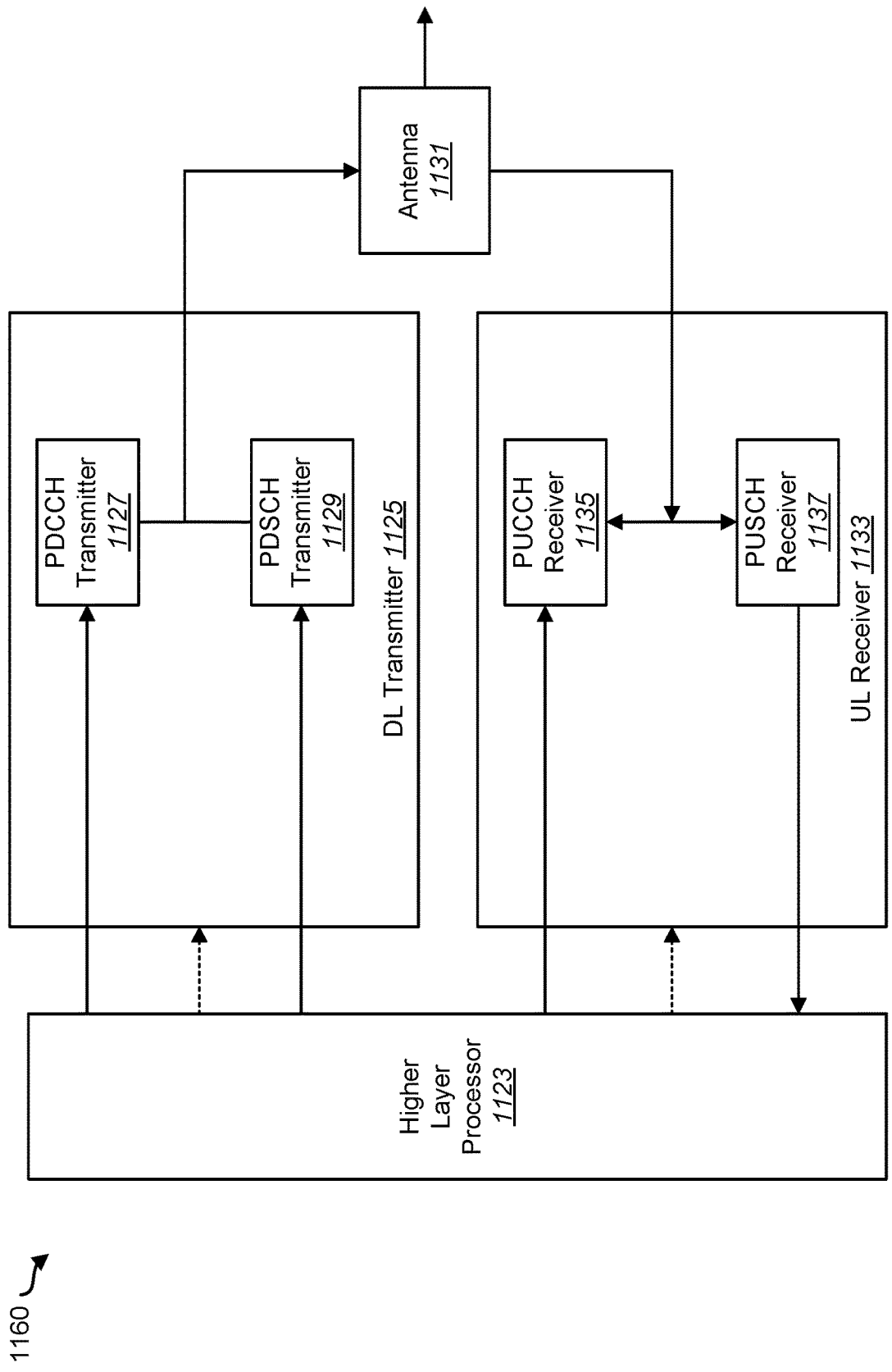
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 uplink control information (UCI). The PUSCH receiver 1137 may provide the higher layer processor 1123 received transport blocks.

Figure 12:
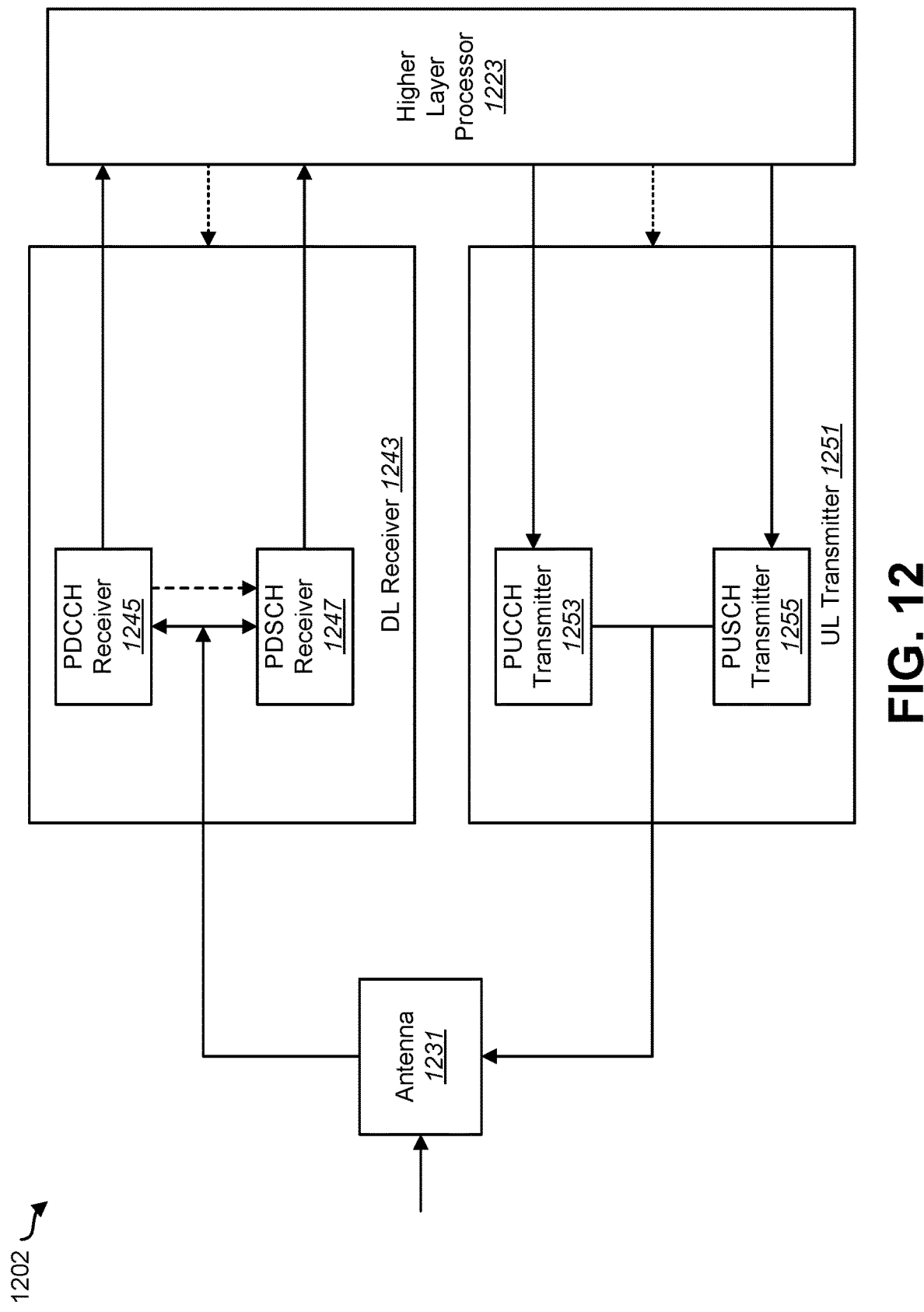
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 downlink control information (DCI). The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
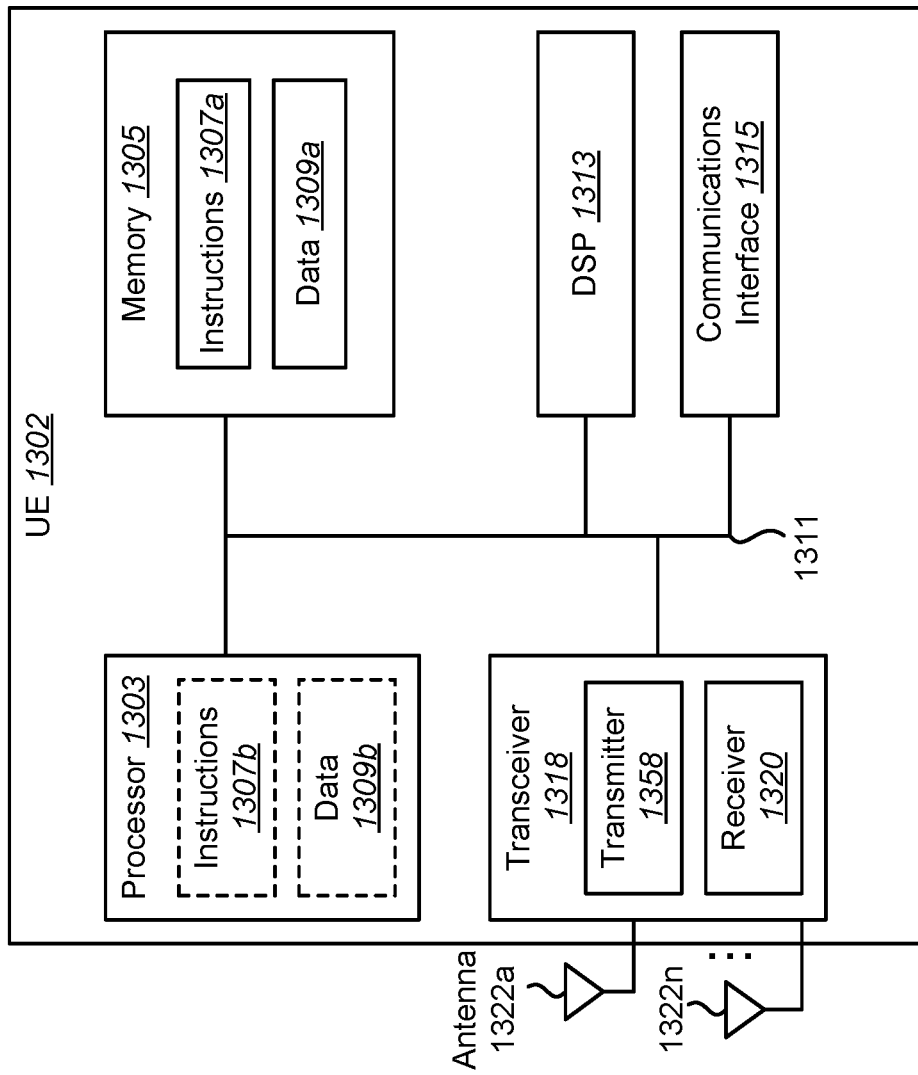
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
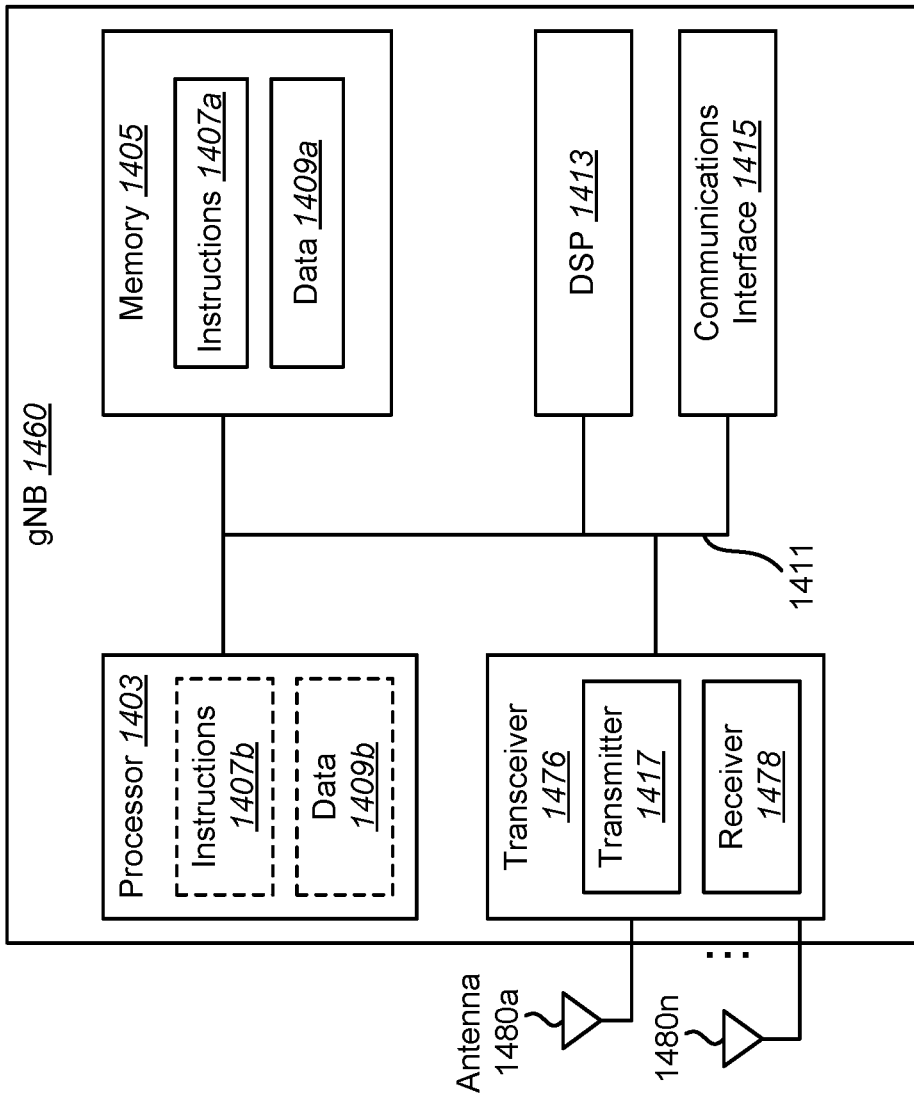
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
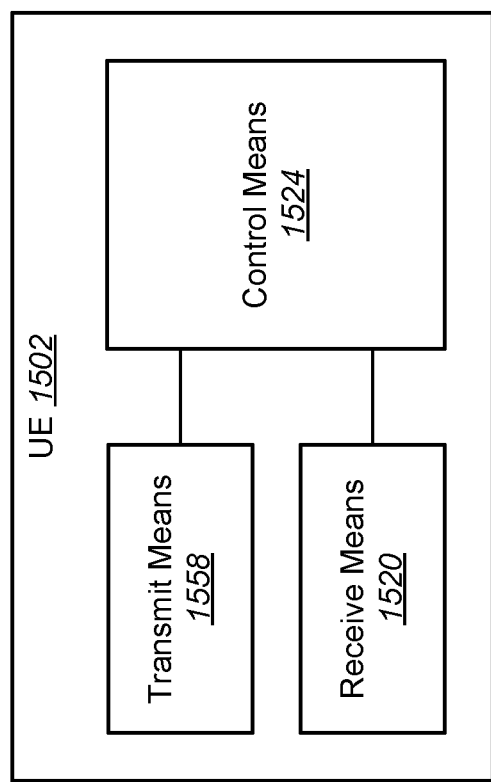
FIG. 15 is a block diagram illustrating one implementation of a UE in which systems and methods for CBG-based transmission operations may be implemented.

FIG. 15 is a block diagram illustrating one implementation of a UE 1502 in which systems and methods for CBG-based transmission operations may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
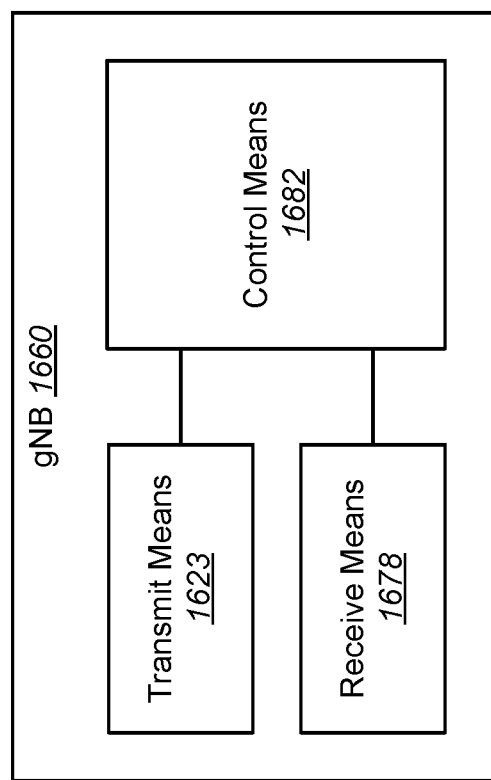
FIG. 16 is a block diagram illustrating one implementation of a gNB in which systems and methods for CBG-based transmission operations may be implemented.

FIG. 16 is a block diagram illustrating one implementation of a gNB 1660 in which systems and methods for CBG-based transmission operations may be implemented. The gNB 1660 includes transmit means 1617, receive means 1678 and control means 1682. The transmit means 1617, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
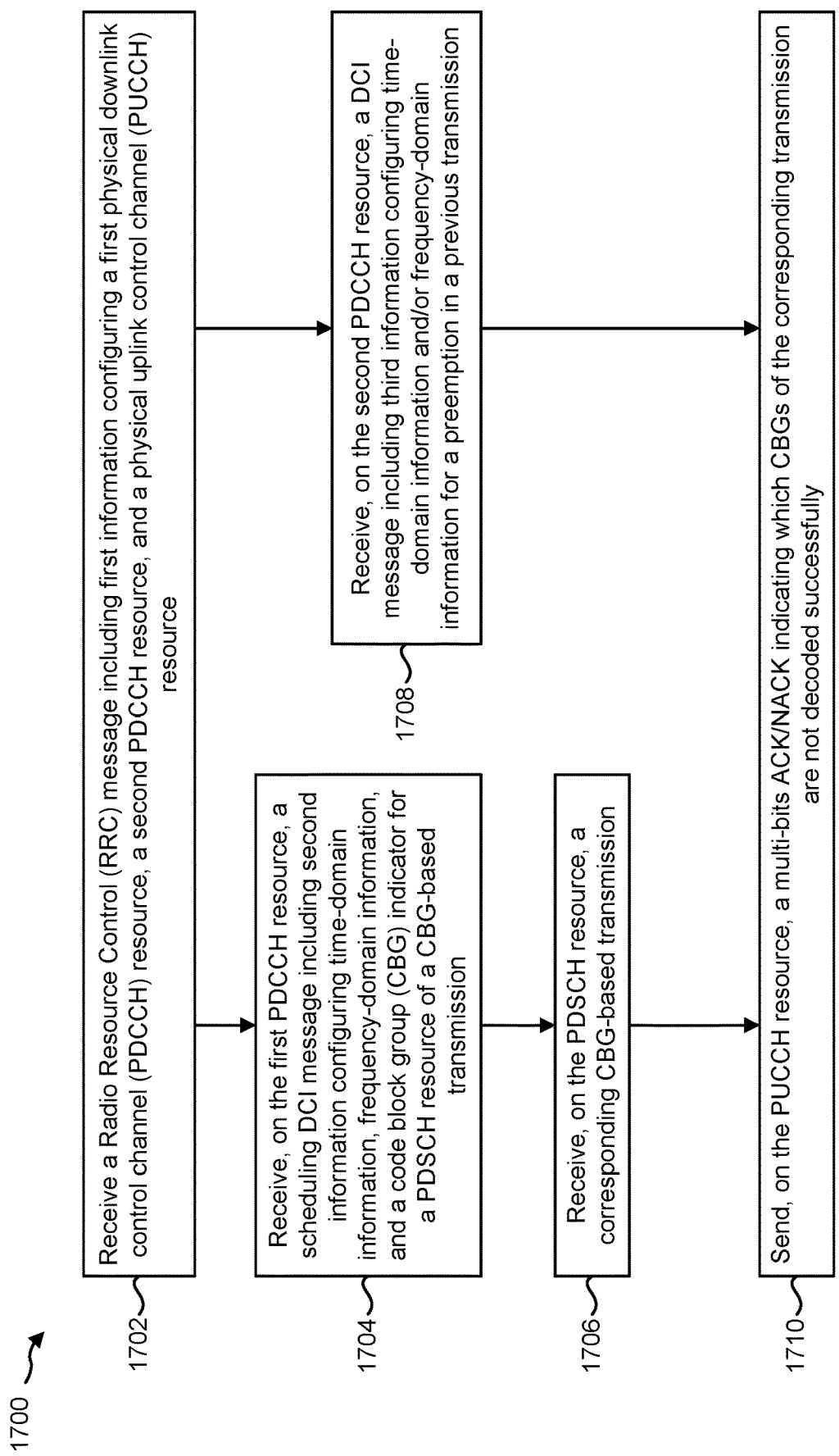
FIG. 17 is a flow diagram illustrating a method for CBG-based transmission.

FIG. 17 is a flow diagram illustrating a method 1700 for CBG-based transmission. The method 1700 may be implemented by a UE 102.

The UE 102 may receive 1702 a Radio Resource Control (RRC) message including first information configuring a first physical downlink control channel (PDCCH) resource, a second PDCCH resource, and a physical uplink control channel (PUCCH) resource.

The UE 102 may receive 1704, on the first PDCCH resource, a scheduling downlink control information (DCI) message including second information configuring time-domain information (e.g., slot offset), frequency-domain information (e.g., resource block index), and a code block group (CBG) indicator for a physical downlink shared channel (PDSCH) resource of a CBG-based transmission. If the CBG indicator field is all zero, the CBG indicator may indicate a new transmission, otherwise, the CBG indicator may be a bitmap for scheduled retransmitted CBGs.

The UE 102 may receive 1706, on the PDSCH resource, a corresponding CBG-based transmission.

The UE 102 may receive 1708, on the second PDCCH resource, a downlink control information (DCI) message including third information configuring time-domain information (e.g., slot offset, mini-slot position) and/or frequency-domain information (e.g., resource block index) for a preemption in a previous transmission. The UE 102 may flush an indicated preempted part of the previous transmission of a transport block (TB) in a buffer according to the third information. The UE 102 may receive a CBG-based transmission of the same TB if the CBG-based retransmission of the same TB is scheduled by the second information. The UE 102 may further soft combine the scheduled CBG-based retransmission with the previous transmission without the preempted part. The UE 102 may decode the CBG-based retransmission.

The UE 102 may send 1710, on the PUCCH resource, a multi-bits acknowledgment or negative acknowledgment (ACK/NACK) indicating which CBGs of the corresponding transmission are not decoded successfully.

Figure 18:
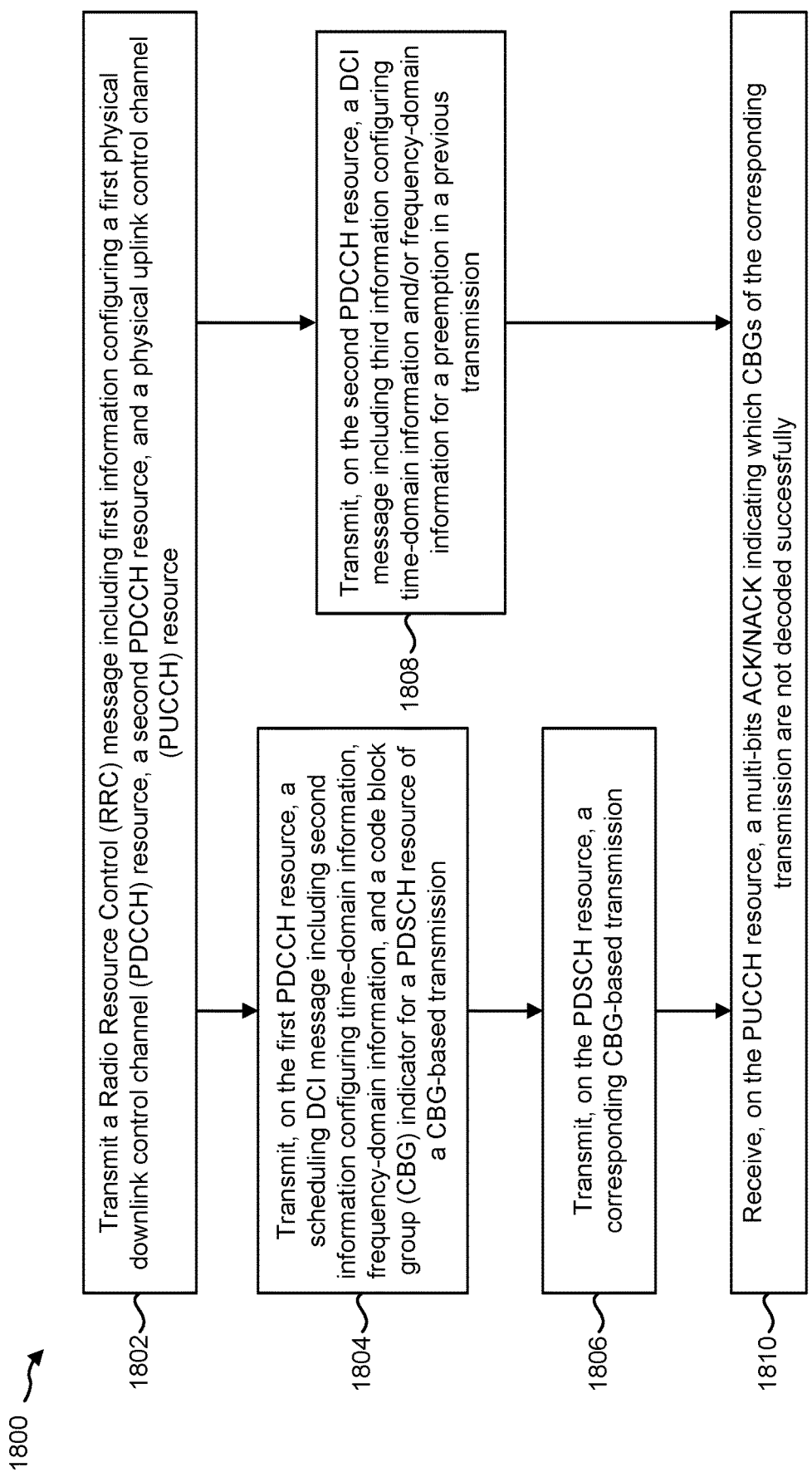
FIG. 18 is a flow diagram illustrating another method for CBG-based transmission.

FIG. 18 is a flow diagram illustrating another method 1800 for CBG-based transmission. The method 1800 may be implemented by a base station (gNB) 160.

The gNB 160 may transmit 1802 a Radio Resource Control (RRC) message including first information configuring a first physical downlink control channel (PDCCH) resource, a second PDCCH resource, and a physical uplink control channel (PUCCH) resource.

The gNB 160 may transmit 1804, on the first PDCCH resource, a scheduling downlink control information (DCI) message including second information configuring time-domain information (e.g., slot offset), frequency-domain information (e.g., resource block index), and a code block group (CBG) indicator for a physical downlink shared channel (PDSCH) resource of a CBG-based transmission. If the CBG indicator field is all zero, the CBG indicator may indicate a new transmission, otherwise, the CBG indicator may be a bitmap for scheduled retransmitted CBGs.

The gNB 160 may transmit 1806, on the PDSCH resource, a corresponding CBG-based transmission.

The gNB 160 may transmit 1808, on the second PDCCH resource, a downlink control information (DCI) message including third information configuring time-domain information (e.g., slot offset, mini-slot position) and/or frequency-domain information (e.g., resource block index) for a preemption in a previous transmission.

The gNB 160 may receive 1810, on the PUCCH resource, a multi-bits acknowledgment or negative acknowledgment (ACK/NACK) indicating which CBGs of the corresponding transmission are not decoded successfully.

Figure 19:
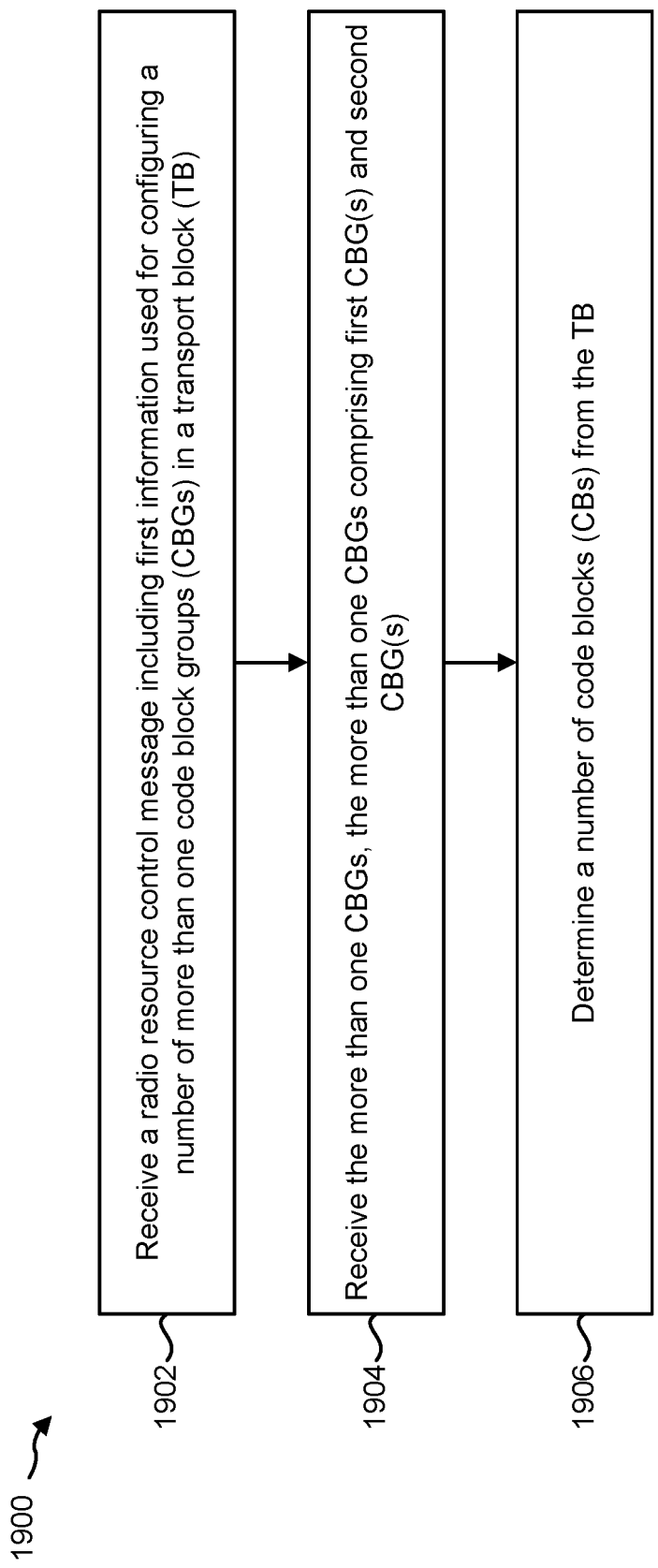
FIG. 19 is a flow diagram illustrating another method for CBG-based transmission.

FIG. 19 is a flow diagram illustrating another method 1900 for CBG-based transmission. The method 1900 may be implemented by a UE 102.

The UE 102 may receive 1902 a radio resource control message including first information used for configuring a number of more than one code block groups (CBGs) in a transport block (TB).

The UE 102 may receive 1904 the more than one CBGs. The more than one CBGs may include first CBG(s) and second CBG(s). The first CBG(s) comprising CBs expressed as $T_g$ (g=0, 1, ..., $G_+$−1) may be given by the following equation $$T_g = \{B_{g \cdot N_+}, B_{g \cdot N_+ + 1}, \Lambda, B_{g \cdot N_+ + N_+ - 1}\},$$

where $B_n$ is the nth CB in the TB and $G_+$ and $N_+$ are determined based on the first information and the number of the CBs in the TB.

The second CBG(s) comprising CBs expressed as $T_g$ ($g \geq G_+$) may be given by the following equation $$T_g = \{B_{G_+ \cdot N_+ + (g-G_+) \cdot N_-}, B_{G_+ \cdot N_+ + (g-G_+) \cdot N_- + 1}, \Lambda, B_{G_+ \cdot N_+ + (g-G_+) \cdot N_- + N_- - 1}\}$$

where $B_n$ is the nth CB in the TB and $G_+$, $N_-$ and $N_+$ are determined based on the first information and the number of the CBs in the TB.

The UE 102 may determine 1906 a number of code blocks (CBs) from the TB. A first number, a second number, a third number, and a fourth number may be given based on the number of more than one CBGs and the number of CBs. The first number may be a number of the first CBG(s). The second number may be a number of CB(s) comprised of each of the first CBG(s). The third number may be a number of the second CBG(s). The fourth number may be a number of CB(s) comprised of each of the second CBG(s).

Figure 20:
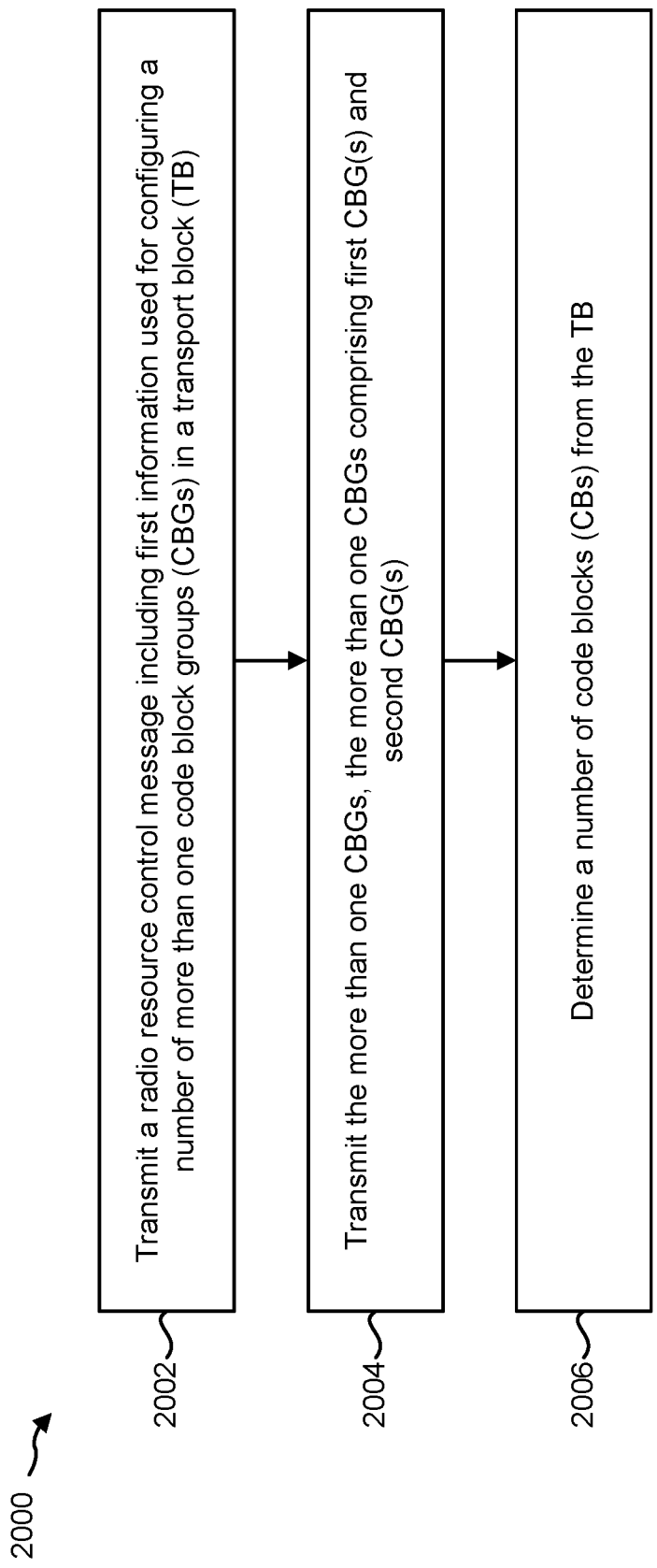
FIG. 20 is a flow diagram illustrating yet another method for CBG-based transmission.

FIG. 20 is a flow diagram illustrating yet another method 2000 for CBG-based transmission. The method 2000 may be implemented by a base station (gNB) 160.

The gNB 160 may transmit 2002 a radio resource control message including first information used for configuring a number of more than one code block groups (CBGs) in a transport block (TB).

The gNB 160 may transmit 2004 the more than one CBGs. The more than one CBGs comprising first CBG(s) and second CBG(s). The first CBG(s) comprising CBs expressed as $T_g$ (g=0, 1, ..., $G_+$−1) may be given by the following equation $$T_g = \{B_{g \cdot N_+}, B_{g \cdot N_+ + 1}, \Lambda, B_{g \cdot N_+ + N_+ - 1}\},$$

where $B_n$ is the nth CB in the TB and $G_+$ and $N_+$ are determined based on the first information and the number of the CBs in the TB.

The second CBG(s) comprising CBs expressed as $T_g$ ($g \geq G_+$) may be given by the following equation $$T_g = \{B_{G_+ \cdot N_+ + (g-G_+) \cdot N_-}, B_{G_+ \cdot N_+ + (g-G_+) \cdot N_- + 1}, \Lambda, B_{G_+ \cdot N_+ + (g-G_+) \cdot N_- + N_- - 1}\}$$

where $B_n$ is the nth CB in the TB and $G_+$, $N_-$ and $N_+$ are determined based on the first information and the number of the CBs in the TB.

The gNB 160 may determine 2006 a number of code blocks (CBs) from the TB. A first number, a second number, a third number, and a fourth number may be given based on the number of more than one CBGs and the number of CBs. The first number may be a number of the first CBG(s). The second number may be a number of CB(s) comprised of each of the first CBG(s). The third number may be a number of the second CBG(s). The fourth number may be a number of CB(s) comprised of each of the second CBG(s).

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment, comprising:
   receiving circuitry configured to receive a radio resource control message comprising first information used for configuring a number of more than one code block groups (CBGs) in a transport block (TB),
   the receiving circuitry being configured to receive an initial transmission of a physical downlink shared channel (PDSCH) that includes the more than one CBGs, the more than one CBGs comprising first CBG(s) and second CBG(s), the initial transmission of the PDSCH being scheduled by using a new data indicator field in a downlink control information format;
   processing circuitry configured to determine a number of code blocks (CBs) in the TB, wherein
   a first number, a second number, a third number, and a fourth number are given based on the number of more than one CBGs and the number of CBs,
   the first number is a number of the first CBG(s),
   the second number is a number of CB(s) comprised of each of the first CBG(s),
   the third number is a number of the second CBG(s), and
   the fourth number is a number of CB(s) comprised of each of the second CBG(s),
   wherein, the second number and the fourth number are given by different calculation methods, and
   the first CBG(s) and the second CBG(s) are included in a single TB received by the user equipment in the initial transmission of the PDSCH; and
   transmitting circuitry configured to transmit respective hybrid automatic repeat request-ACK (HARQ-ACK) bits for the more than one CBGs,
   the receiving circuitry being configured to receive a retransmission of the PDSCH that includes a subset of the more than one CBGs, the retransmission of the PDSCH being scheduled by using a CBG transmission information (CBGTI) field and a CBG flushing out information (CBGFI) field in the downlink control information format, wherein
   the CBGTI field indicates the subset of the more than one CBGs to be retransmitted and the CBGFI field directly indicates whether soft combining is applied to the subset of the more than one CBGs or not,
   the processing circuitry being configured to decode the subset of the more than one CBGs according to the CBGTI field and the CBGFI field.

2. A base station apparatus comprising:
   transmitting circuitry configured to transmit a radio resource control message comprising first information used for configuring a number of more than one code block groups (CBGs) in a transport block (TB),
   the transmitting circuitry being configured to transmit an initial transmission of a physical downlink shared channel (PDSCH) that includes the more than one CBGs, the more than one CBGs comprising first CBG(s) and second CBG(s), the initial transmission of the PDSCH being scheduled by using a new data indicator field in a downlink control information format;

processing circuitry configured to determine a number of code blocks (CBs) in the TB, wherein a first number, a second number, a third number, and a fourth number are given based on the number of more than one CBGs and the number of CBs, the first number is a number of the first CBG(s), the second number is a number of CB(s) comprised of each of the first CBG(s), the third number is a number of the second CBG(s), and the fourth number is a number of CB(s) comprised of each of the second CBG(s), wherein, the second number and the fourth number are given by different calculation methods, and the first CBG(s) and the second CBG(s) are included in a single TB received by a user equipment in the initial transmission of the PDSCH; and receiving circuitry configured to receive respective hybrid automatic repeat request-ACK (HARQ-ACK) bits for the more than one CBGs, the transmitting circuitry being configured to transmit a retransmission of the PDSCH that includes a subset of the more than one CBGs, the retransmission of the PDSCH being scheduled by using a CBG transmission information (CBGTI) field and a CBG flushing out information (CBGFI) field in the downlink control information format, wherein the CBGTI field indicates the subset of the more than one CBGs to be retransmitted and the CBGFI field directly indicates whether soft combining is applied to the subset of the more than one CBGs or not.

3. A communication method of a user equipment comprising:

receiving a radio resource control message comprising first information used for configuring a number of more than one code block groups (CBGs) in a transport block (TB), receiving an initial transmission of a physical downlink shared channel (PDSCH) that includes the more than one CBGs, the more than one CBGs comprising first CBG(s) and second CBG(s), the initial transmission of the PDSCH being scheduled by using a new data indicator field in a downlink control information format;

determining a number of code blocks (CB s) in the TB, wherein a first number, a second number, a third number, and a fourth number are given based on the number of more than one CBGs and the number of CBs, the first number is a number of the first CBG(s), the second number is a number of CB(s) comprised of each of the first CBG(s), the third number is a number of the second CBG(s), and the fourth number is a number of CB(s) comprised of each of the second CBG(s), wherein, the second number and the fourth number are given by different calculation methods, and the first CBG(s) and the second CBG(s) are included in a single TB received by the user equipment in the initial transmission of the PDSCH;

transmitting respective hybrid automatic repeat request-ACK (HARQ-ACK) bits for the more than one CBGs;

receiving a retransmission of the PDSCH that includes a subset of the more than one CBGs, the retransmission of the PDSCH being scheduled by using a CBG transmission information (CBGTI) field and a CBG flushing out information (CBGFI) field in the downlink control information format, wherein the CBGTI field indicates the subset of the more than one CBGs to be retransmitted and the CBGFI field directly indicates whether soft combining is applied to the subset of the more than one CBGs or not; and decoding the subset of the more than one CBGs according to the CBGTI field and the CBGFI field.

4. A communication method of a base station apparatus comprising:

transmitting a radio resource control message comprising first information used for configuring a number of more than one code block groups (CBGs) in a transport block (TB), transmitting an initial transmission of a physical downlink shared channel (PDSCH) that includes the more than one CBGs, the more than one CBGs comprising first CBG(s) and second CBG(s), the initial transmission of the PDSCH being scheduled by using a new data indicator field in a downlink control information format;

determining a number of code blocks (CBs) in the TB, wherein a first number, a second number, a third number, and a fourth number are given based on the number of more than one CBGs and the number of CBs, the first number is a number of the first CBG(s), the second number is a number of CB(s) comprised of each of the first CBG(s), the third number is a number of the second CBG(s), and the fourth number is a number of CB(s) comprised of each of the second CBG(s), wherein, the second number and the fourth number are given by different calculation methods, and the first CBG(s) and the second CBG(s) are included in a single TB received by a user equipment in the initial transmission of the PDSCH;

receiving respective hybrid automatic repeat request-ACK (HARQ-ACK) bits for the more than one CBGs; and transmitting a retransmission of the PDSCH that includes a subset of the more than one CBGs, the retransmission of the PDSCH being scheduled by using a CBG transmission information (CBGTI) field and a CBG flushing out information (CBGFI) field in the downlink control information format, wherein the CBGTI field indicates the subset of the more than one CBGs to be retransmitted and the CBGFI field directly indicates whether soft combining is applied to the subset of the more than one CBGs or not.

* * * * *